US009738170B2

(12) United States Patent
Okamoto

(10) Patent No.: US 9,738,170 B2
(45) Date of Patent: Aug. 22, 2017

(54) WIRELESS POWER SUPPLY SYSTEM AND POWER TRANSMISSION DEVICE

(71) Applicant: Nissan Motor Co., Ltd., Yokohama-Shi, Kanagawa (JP)

(72) Inventor: Tomofumi Okamoto, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 15/119,990

(22) PCT Filed: Feb. 25, 2014

(86) PCT No.: PCT/JP2014/054519
§ 371 (c)(1),
(2) Date: Aug. 18, 2016

(87) PCT Pub. No.: WO2015/128941
PCT Pub. Date: Sep. 3, 2015

(65) Prior Publication Data
US 2017/0066336 A1    Mar. 9, 2017

(51) Int. Cl.
*H02J 7/00* (2006.01)
*B60L 11/18* (2006.01)
(Continued)

(52) U.S. Cl.
CPC ........... *B60L 11/184* (2013.01); *B60L 11/182* (2013.01); *B60L 11/1824* (2013.01);
(Continued)

(58) Field of Classification Search
CPC ...... B60L 11/184; B60L 11/1809; H02J 7/025

USPC .................................. 320/108, 109; 307/104
See application file for complete search history.

(56) References Cited

U.S. PATENT DOCUMENTS 6,316,909 B1  11/2001  Honda et al.
8,742,719 B2   6/2014  Nakamura et al.
(Continued)

FOREIGN PATENT DOCUMENTS

JP  2010119246 A  5/2010
JP  2012060807 A  3/2012
(Continued)

*Primary Examiner* — Drew A Dunn
*Assistant Examiner* — Zixuan Zhou
(74) *Attorney, Agent, or Firm* — Young Basile Hanlon & MacFarlane, P.C.

(57) ABSTRACT

A wireless power supply system includes a power transmission device having a power transmission coil and a power receiving device having a power receiving coil. The power transmission coil transmits electric power to the power receiving coil via a wireless connection. The power transmission device includes a power factor calculator configured to calculate a power factor based on a phase difference between a voltage and a current supplied to the power transmission coil, and a control amount calculator configured to control electric power supplied to the power transmission coil according to a power command value, and regulate the electric power supplied to the power transmission coil when the power factor falls to a predetermined threshold power factor or less. The power transmission can therefore be regulated immediately when the power receiving coil is shifted from the power transmission coil.

2 Claims, 17 Drawing Sheets

(51) Int. Cl.
*H02J 50/12* (2016.01)
*H02J 50/80* (2016.01)
*H02J 7/02* (2016.01)

(52) U.S. Cl.
CPC ........... *B60L 11/1861* (2013.01); *H02J 7/025* (2013.01); *H02J 50/12* (2016.02); *H02J 50/80* (2016.02); *B60L 2230/16* (2013.01); *H02J 2007/0096* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 90/12* (2013.01); *Y02T 90/121* (2013.01); *Y02T 90/122* (2013.01); *Y02T 90/127* (2013.01); *Y02T 90/14* (2013.01)

(56) References Cited

U.S. PATENT DOCUMENTS

| | | |
|---|---|---|
| 9,172,251 B2 | 10/2015 | Amano et al. |
| 2010/0072825 A1* | 3/2010 | Azancot ................. H02J 5/005 307/104 |
| 2011/0270462 A1 | 11/2011 | Amano et al. |
| 2013/0162205 A1 | 6/2013 | Nakamura et al. |
| 2013/0285620 A1 | 10/2013 | Yamamoto et al. |
| 2013/0307471 A1 | 11/2013 | Ichikawa et al. |
| 2014/0103871 A1 | 4/2014 | Maikawa et al. |
| 2014/0203774 A1 | 7/2014 | Sawayanagi et al. |
| 2015/0171633 A1 | 6/2015 | Nakano et al. |
| 2015/0224883 A1* | 8/2015 | Ichikawa ............. B60L 11/1842 320/108 |
| 2016/0218567 A1 | 7/2016 | Nakano et al. |

FOREIGN PATENT DOCUMENTS

| | | |
|---|---|---|
| JP | 2012130173 A * | 7/2012 |
| JP | 2012249407 A | 12/2012 |
| JP | 2013123306 A | 6/2013 |
| JP | 2013172507 A | 9/2013 |
| JP | 2014007838 A | 1/2014 |
| WO | 9949552 A1 | 9/1999 |
| WO | 2013046391 A1 | 4/2013 |
| WO | 2013153772 A1 | 10/2013 |
| WO | 2013190809 A1 | 12/2013 |

* cited by examiner

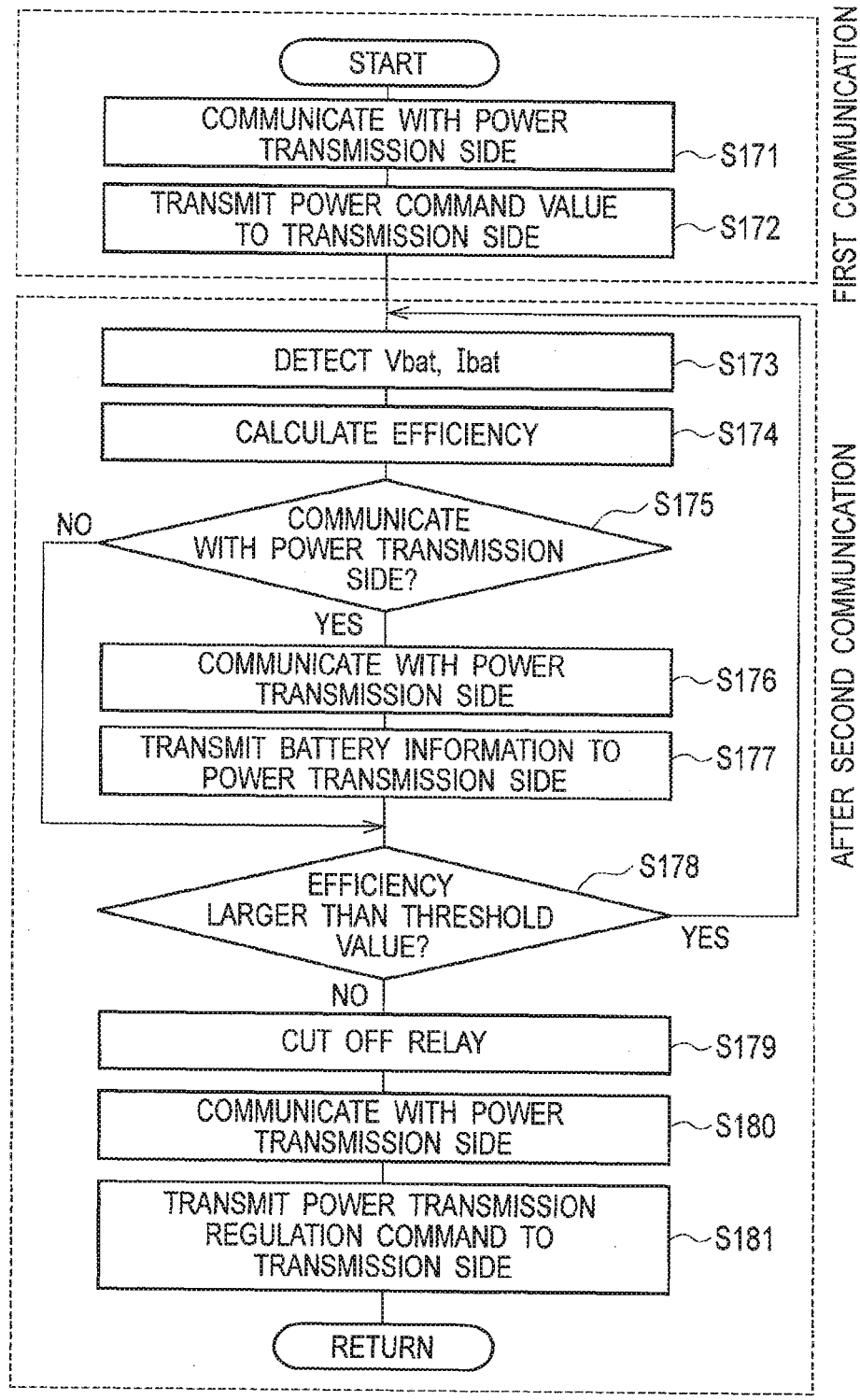

WIRELESS POWER SUPPLY SYSTEM AND POWER TRANSMISSION DEVICE

TECHNICAL FIELD

The present invention relates to a wireless power supply system and a power transmission device for supplying electric power via a wireless connection to a vehicle, such as an electric vehicle equipped with a battery.

BACKGROUND

Wireless power supply systems have been proposed that supply electric power to electrical loads mounted on vehicles via a wireless connection between power transmission devices provided on the ground side and power receiving devices provided on the vehicle side. A vehicle using such a wireless power supply system and parked in a power supply position may be moved from the power supply position during power supply. The system is required to immediately detect a positional shift between a power transmission coil and a power receiving coil due to the movement of the vehicle so as to stop the power supply.

For example, International Publication WO 2013/046391 discloses a system in which a power transmission device and a power receiving device communicate with each other so as to control an appropriate supply of voltage. International Publication WO 2013/046391 discloses that the communication between the power transmission device and the power receiving device is implemented for a second cycle, and the power transmission device is controlled so as to appropriately transmit electric power for a first cycle shorter than the second cycle.

International Publication WO 2013/046391 fails to disclose that the power transmission is regulated when the positions of the power transmission coil and the power receiving coil are shifted from each other during wireless power supply.

SUMMARY

The present invention has been made in view of the conventional problem described above. An object of the present invention is to provide a wireless power supply system and a power transmission device capable of regulating power transmission when positions of a power transmission coil and a power receiving coil are shifted from each other.

A wireless power supply system according to an aspect of the present invention includes a power transmission device having a power transmission coil and a power receiving device having a power receiving coil, and the power transmission coil transmits electric power to the power receiving coil via a wireless connection, so as to supply the electric power to an electrical load installed in the power receiving device. The power transmission device includes a power factor calculator configured to calculate a power factor based on a phase difference between a voltage and a current supplied to the power transmission coil, and a power controller configured to control electric power supplied to the power transmission coil according to a transmission power command value, and regulate the electric power supplied to the power transmission coil when the power factor falls to a predetermined threshold power factor or less.

A power transmission device according to an aspect of the present invention has a power transmission coil and supplies electric power via a wireless connection to an electrical load installed in a power receiving device having a power receiving coil. The power transmission device includes a power factor calculator configured to calculate a power factor based on a phase difference between a voltage and a current supplied to the power transmission coil, and a power controller configured to regulate electric power supplied to the power transmission coil when the power factor falls to a predetermined threshold power factor or less.

BRIEF DESCRIPTION OF THE DRAWINGS

FIG. 16 is a flowchart showing a processing procedure of a power transmission controller in the wireless power supply system according to the modified example of the fourth embodiment of the present invention' and FIG. 17 is a flowchart showing a processing procedure of a power receiving controller in the wireless power supply system according to the modified example of the fourth embodiment of the present invention.

DETAILED DESCRIPTION OF THE EMBODIMENTS

Figure 1:
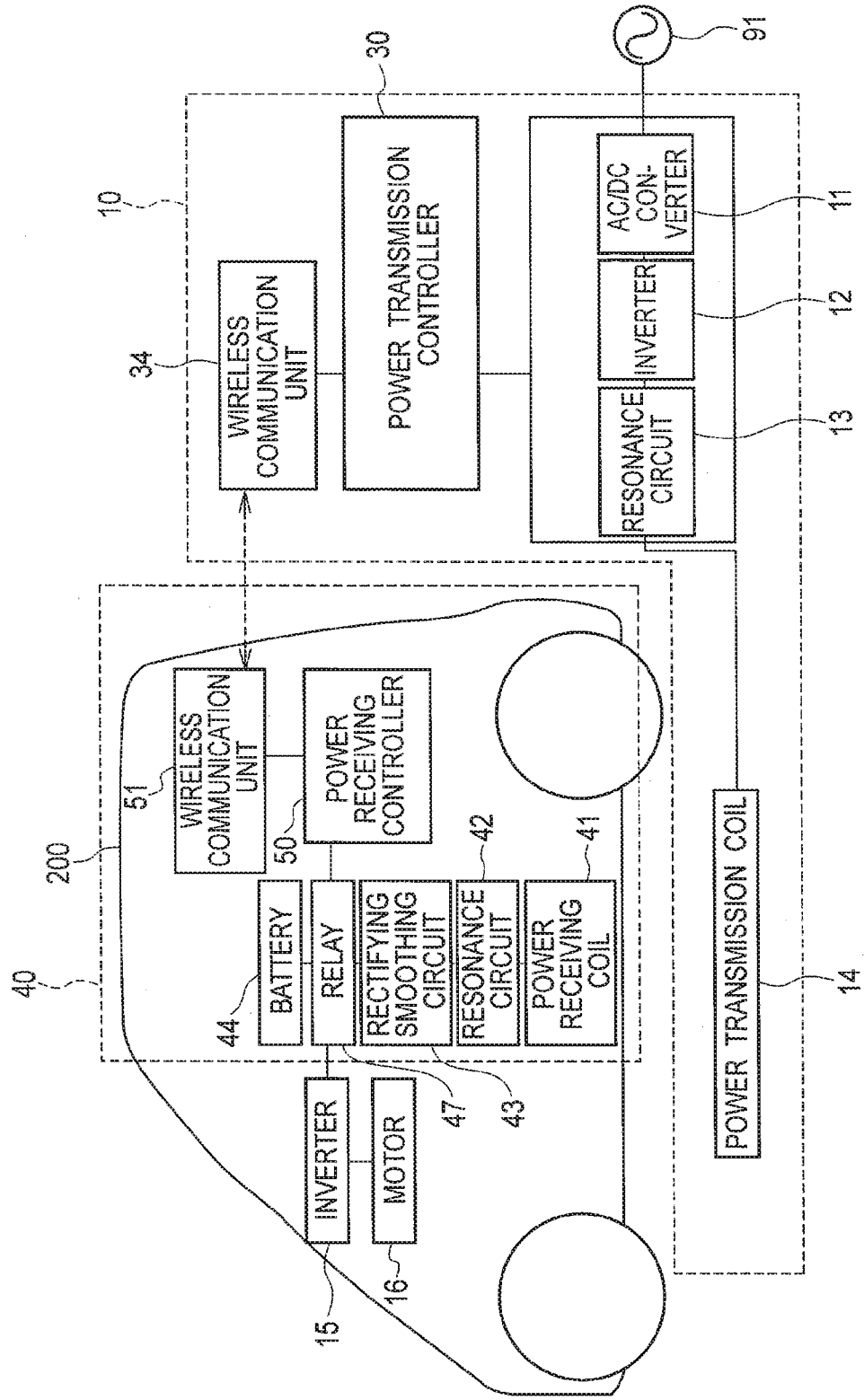
FIG. 1 is a block diagram showing a configuration of a wireless power supply system according to an embodiment of the present invention.

Hereinafter, embodiments of the present invention will be explained with reference to the drawings. FIG. 1 is a block diagram showing a configuration of a wireless power supply system according to the present invention. As shown in FIG. 1, a vehicle 200 includes a power receiving device 40. A power transmission device 10 for supplying electric power to the vehicle 200 is provided on the ground side in a parking space in which the vehicle 200 is parked. The power transmission device 10 includes an AC/DC converter 11 for rectifying AC voltage supplied from an AC power source 91, an inverter circuit 12, a resonance circuit 13, and a power transmission coil 14. The power transmission device 10 further includes a power transmission controller 30.

The power receiving coil 40 includes a power receiving coil 41, a resonance circuit 42, a rectifying smoothing circuit 43, a relay 47, and a battery 44. The power receiving coil 40 further includes a power receiving controller 50, an inverter 51 for converting DC voltage output from the battery 44 into AC voltage, and a motor 16 driven by the supply of the AC voltage output from the inverter 51.

First Embodiment

Figure 2:
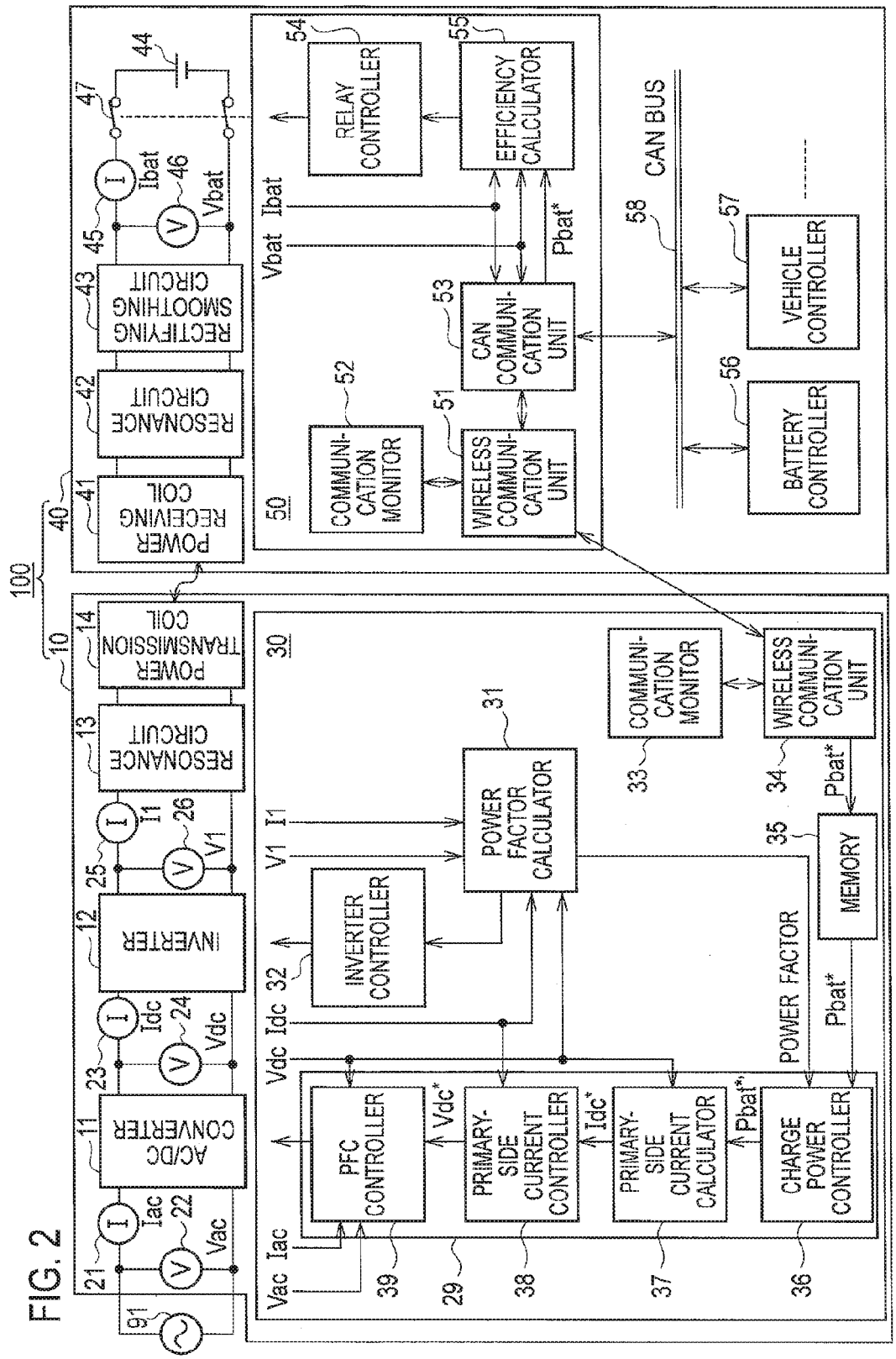
FIG. 2 is a block diagram showing a configuration of a wireless power supply system according to a first embodiment of the present invention.

FIG. 2 is a block diagram showing a configuration of a wireless power supply system according to a first embodiment of the present invention. As shown in FIG. 2, the wireless power supply system 100 includes the power transmission device 10 provided on the ground side to transmit electric power, and the power receiving device 40 that receives the power transmitted from the power transmission device 10 to supply the power to the battery 44 (electrical load). Although the present embodiment exemplifies the battery 44 as an electrical load, the present invention is not limited thereto and may use other electrical loads such as a motor.

The power transmission device 10 includes the AC/DC converter 11 that converts AC voltage supplied from the AC power source 91 into DC voltage, and the inverter circuit 12 that converts the DC voltage converted by the AC/DC converter 11 into AC voltage having preferred frequency and amplitude. The power transmission device 10 also includes the resonance circuit 13 that resonates electric power output from the inverter circuit 12, the power transmission coil 14 that transmits the resonated power, and the power transmission controller 30.

The power transmission device 10 includes an ammeter 21 that detects AC current Iac and a voltmeter 22 that detects AC voltage Vac, the AC current Iac and the AC voltage Vac being supplied to the AC/DC converter 11. The power transmission device 10 includes an ammeter 23 that detects DC current Idc and a voltmeter 24 that detects DC voltage Vdc, the DC current Idc and the DC voltage Vdc being input into the inverter circuit 12, and further includes an ammeter 25 that detects AC current I1 and a voltmeter 26 that detects AC voltage V1, the AC current I1 and the AC voltage V1 being output from the inverter circuit 12. The AC/DC converter 11 controls a duty ratio when converting the AC voltage supplied from the AC power source 91 according to a control signal output from a PFC controller 39 described below, so as to generate the DC voltage having preferred amplitude.

The inverter circuit 12 includes a plurality of semiconductor switches (such as IGBT) having upper and lower arms, and turns on/off the respective semiconductor switches according to a control signal output from an inverter controller 32 described below, so as to generate the AC voltage having preferred frequency and amplitude.

The resonance circuit 13 includes a capacitor and an element such as a resistance, and resonates the AC power output from the inverter circuit 12 between the resonance circuit 13 and the power transmission coil 14. Namely, the resonance frequency of the power transmission coil 14 and the capacitor is configured to approximately coincide with the output frequency of the inverter circuit 12.

The power transmission coil 14 is, for example, a spiral coil, a disk-shaped coil, a circular coil, or a solenoid coil, provided on the ground in the parking space. As shown in FIG. 1, the power transmission coil 14 is positioned to be opposed to the power receiving coil 41 when the vehicle 200 is parked in a predetermined position in the parking space (refer to FIG. 1).

The power transmission controller 30 includes a power factor calculator 31, an inverter controller 32, and a control amount calculator 29 (power controller). The power transmission controller 30 further includes a wireless communication unit 34 (power transmission-side communication unit) that communicates with the power receiving controller 50, a communication monitor 33 that monitors communication conditions of the wireless communication unit 34, and a memory 35 that stores power command value Pbat* received via wireless communication. The "power command value Pbat*" as used herein is a command value of electric power supplied from the power transmission coil 14, and is transmitted from the power receiving device 40.

The power factor calculator 31 obtains, for a predetermined calculation cycle (first cycle), the DC voltage Vdc and the DC current Idc supplied to the inverter circuit 12, and the AC voltage V1 and the AC current I1 output from the inverter circuit 12. The power factor calculator 31 calculates a power factor cos θ (second efficiency) of the electric power output from the inverter 12 based on these Vdc, Idc, V1, and I1. More particularly, the power factor calculator 31 calculates the power factor cos θ according to the following formula (1).

$$\cos θ = (Vdc \times Idc)/(V1 \times I1) \tag{1}$$

The power factor cos θ used in the current calculation cycle can be obtained by use of Vdc, Idc, V1, and I1 obtained in the previous calculation cycle. The method of calculating the power factor cos θ is not limited to the formula (1), and may be any method, such as a method of measuring a phase difference θ between the voltage V1 and the current I1 to obtain the power factor cos θ based on the measured phase difference θ.

The inverter controller 32 controls the inverter circuit 12 to transmit the electric power corresponding to the power command value Pbat* based on the power factor cos θ calculated by the power factor calculator 31.

The wireless communication unit 34 implements various kinds of data communication with the power receiving controller 50 via a local area network (LAN), for example. The wireless communication unit 34 receives the power command value Pbat* transmitted from the power receiving controller 50. The wireless communication unit 34 also receives a regulation command signal of charge power transmitted from the power receiving controller 50. The wireless communication unit 34 implements the data communication for a second cycle longer than the first cycle that is the calculation cycle of the power factor cos θ calculated by the power factor calculator 31 as described above. The wireless communication unit 34 thus receives the power command value Pbat* transmitted from the power receiving controller 50 for the second cycle when the communication is operated appropriately.

The communication monitor 33 monitors the communication conditions of the wireless communication unit 34. The memory 35 stores the power command value Pbat* received by the wireless communication unit 34, and outputs the stored power command value Pbat* to the control amount calculator 29.

The control amount calculator 29 includes a charge power controller 36, a primary-side current calculator 37, a primary-side current controller 38, and a PFC controller 39. The charge power controller 36 obtains the power command value Pbat* stored in the memory 35 and the power factor cos θ calculated by the power factor calculator 31, so as to correct the power command value Pbat* by use of the power factor cos θ The charge power controller 36 outputs the corrected power command value Pbat*'. In particular, the charge power controller 36 calculate the corrected power command value Pbat*' according to the following formula (3).

$$P\text{bat}*' = P\text{bat}*/\cos\theta \quad (3)$$

The primary-side current calculator 37 calculates output current command value Idc* of the AC/DC converter 11 according to the corrected power command value Pbat*' and the DC voltage Vdc output from the AC/DC converter 11 in the previous calculation cycle.

The primary-side current controller 38 calculates output voltage command value Vdc* of the AC/DC converter 11 according to the output current command value Idc* calculated by the primary-side current calculator 37 and the DC current Idc output from the AC/DC converter 11 in the previous calculation cycle.

The PFC controller 39 determines a duty ratio of conversion in the AC voltage converted and controlled by the AC/DC converter 11 according to the DC voltage Vdc detected by the voltmeter 24 in the previous calculation cycle and the output voltage command value Vdc* output from the primary-side current controller 38. The PFC controller 39 obtains the current Iac detected by the ammeter 21 (current output from the current power source 91) in the previous cycle and the voltage Vac detected by the voltmeter 22 (voltage output from the current power source 91), and changes a command value of the duty ratio as appropriate so that the current Iac and the voltage Vac have the same phase. The command value of the duty ratio is output to the AC/DC converter 11. The AC/DC converter 11 thus controls the output voltage Vdc so that the power corresponding to the power command value Pbat* is transmitted from the power transmission coil 14.

The power receiving device 40 includes the power receiving coil 41 that receives the power transmitted from the power transmission coil 14 via a wireless connection, the resonance circuit 42 that resonates the power received by the power receiving coil 41, and the rectifying smoothing circuit 43 that converts the AC voltage output from the resonance circuit 42 into DC voltage and smooths the converted DC voltage. The power receiving device 40 also includes the battery 44 that stores the electric power transmitted from the power transmission device 10, the relay 47 (switching unit) that switches connection and disconnection between the rectifying smoothing circuit 43 and the battery 44, and the power receiving controller 50. The power receiving device 40 further includes an ammeter 45 that detects current Ibat and a voltmeter 46 that detects voltage Vbat, the current Ibat and the voltage Vbat being output from the rectifying smoothing circuit 43.

The power receiving coil 41 is, for example, a spiral coil, a disk-shaped coil, a circular coil, or a solenoid coil, mounted on the bottom of the vehicle. The power receiving coil 41 is positioned to be opposed to the power transmission coil 14 provided on the ground in a predetermined charge position in the parking space when the vehicle is parked in the charge position.

The resonance circuit 42 includes a capacitor and an element such as a resistance, and resonates the AC power received by the power receiving coil 41. Namely, the resonance frequency of the circuit including the power receiving coil 41 and the capacitor is configured to approximately coincide with the frequency of the AC power transmitted from the power transmission coil 14.

The rectifying smoothing circuit 43 includes a rectifying circuit such as a diode bridge circuit, and a smoothing circuit including a capacitor. The rectifying smoothing circuit 43 rectifies the AC voltage output from the resonance circuit 42, and further smooths and supplies the AC voltage to the battery 44.

The relay 47 supplies the power received by the power receiving coil 41 to the battery 44 (electrical load) once connected, and stops supplying the power to the battery 44 once disconnected. The relay 47 thus serves as a switching unit for switching between the operation of supplying the power received by the power receiving coil 41 to the electrical load (the battery 44) and the operation of stopping the supply to the electrical load.

The power receiving controller 50 includes a wireless communication unit 51 (power receiving-side communication unit) that communicates with the wireless communication unit 34 provided in the power transmission controller 30 in a wireless manner such as LAN communication, a communication monitor 52 that monitors communication conditions of the wireless communication unit 51, a CAN communication unit 53, an efficiency calculator 55, and a relay controller 54 (switching controller).

The CAN communication unit 53 is connected to various types of controllers, such as a battery controller 56 and a vehicle controller 57, through a BUS line 58 to implement data communication therebetween via a controller area network (CAN). The battery controller 56 generates power command value Pbat* and output it to the CAN communication unit 53 through the BUS line 58.

The efficiency calculator 55 obtains the power command value Pbat* transmitted through the CAN communication unit 53, and further obtains the current Ibat detected by the ammeter 45 and the voltage Vbat detected by the voltmeter 46, so as to calculate power transmission efficiency η (first efficiency) of the electric power transmitted between the power transmission device 10 and the power receiving device 40 according to the obtained data. In particular, the efficiency calculator 55 calculates transmitted power Pbat by multiplying the current Ibat and the voltage Vbat together, so as to obtain the power transmission efficiency η according to the following formula (2).

$$\eta = P\text{bat}/P\text{bat}* = (I\text{bat} \times V\text{bat})/P\text{bat}* \quad (2)$$

When the power transmission efficiency η calculated according to the formula (2) falls to predetermined threshold efficiency ηth or less, the efficiency calculator 55 outputs a cut-off command signal to the relay controller 54. The efficiency calculator 55 further outputs a regulation command signal of charge power. The regulation command signal is transmitted to the power transmission device 10 via the wireless communication unit 51.

When the relay controller 54 receives the cut-off command signal supplied from the efficiency calculator 55, the relay controller 54 cuts off the relay 47, and stops supplying the power to the battery 44. More particularly, when the power transmission efficiency η calculated by the efficiency calculator 55 falls to the threshold efficiency ηth or less, the relay controller 54 determines that a problem is caused between the power transmission coil 14 and the power receiving coil 41 for some reason, and stops supplying the power to the battery 44.

In the wireless power supply system 100 according to the first embodiment, when the power factor cos θ calculated by the power factor calculator 31 falls below the predetermined threshold power factor, the corrected power command value Pbat*' calculated by the charge power controller 36 is regulated, so that the power transmitted from the power transmission device 10 to the power receiving device 40 is regulated. As used herein, the term "regulate" includes the meanings of "reduce" and "reduce to zero".

Since the relay 47 is cut off when the power transmission efficiency η calculated by the efficiency calculator 55 falls to the threshold efficiency ηth or less, the circuit on the power receiving device 40 side including the power receiving coil 41 and the battery 44 is open as viewed from the power transmission coil 14 side. As a result, the impedance of the entire circuit, including the power transmission coil 14, the power receiving coil 41, and the battery 44 increases, and the phase difference between the current I1 and the voltage V1 output from the inverter circuit 12 increases. Accordingly, the transmitted power is regulated since the power factor cos θ decreases. Further, the regulation command signal of the charge power is transmitted to the power transmission controller 30 through the wireless communication unit 51 when the power transmission efficiency η falls to the threshold efficiency ηth or less, and the output power is regulated accordingly.

Figure 3:
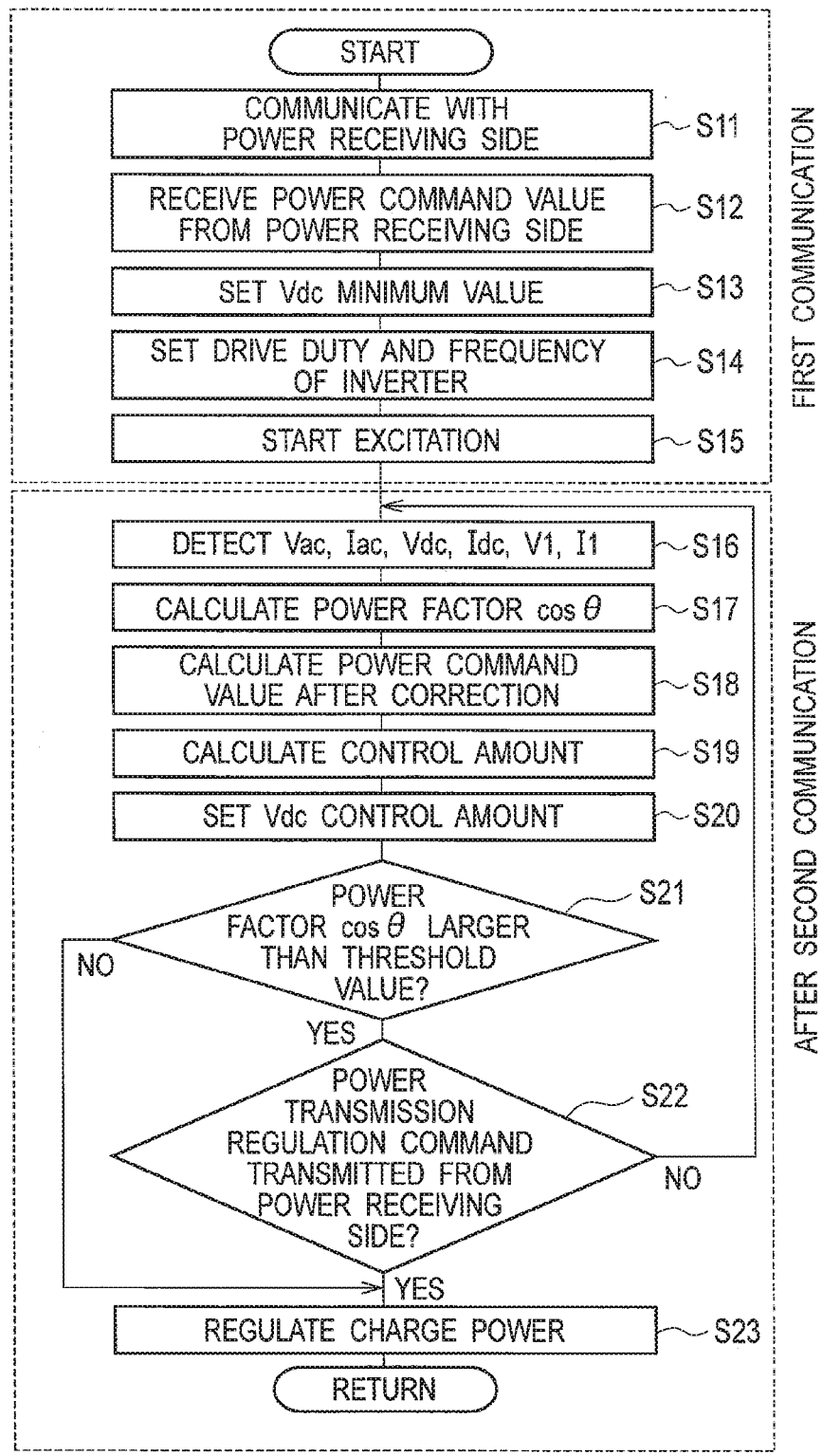
FIG. 3 is a flowchart showing a processing procedure of a power transmission controller in the wireless power supply system according to the first embodiment of the present invention.
Figure 4:
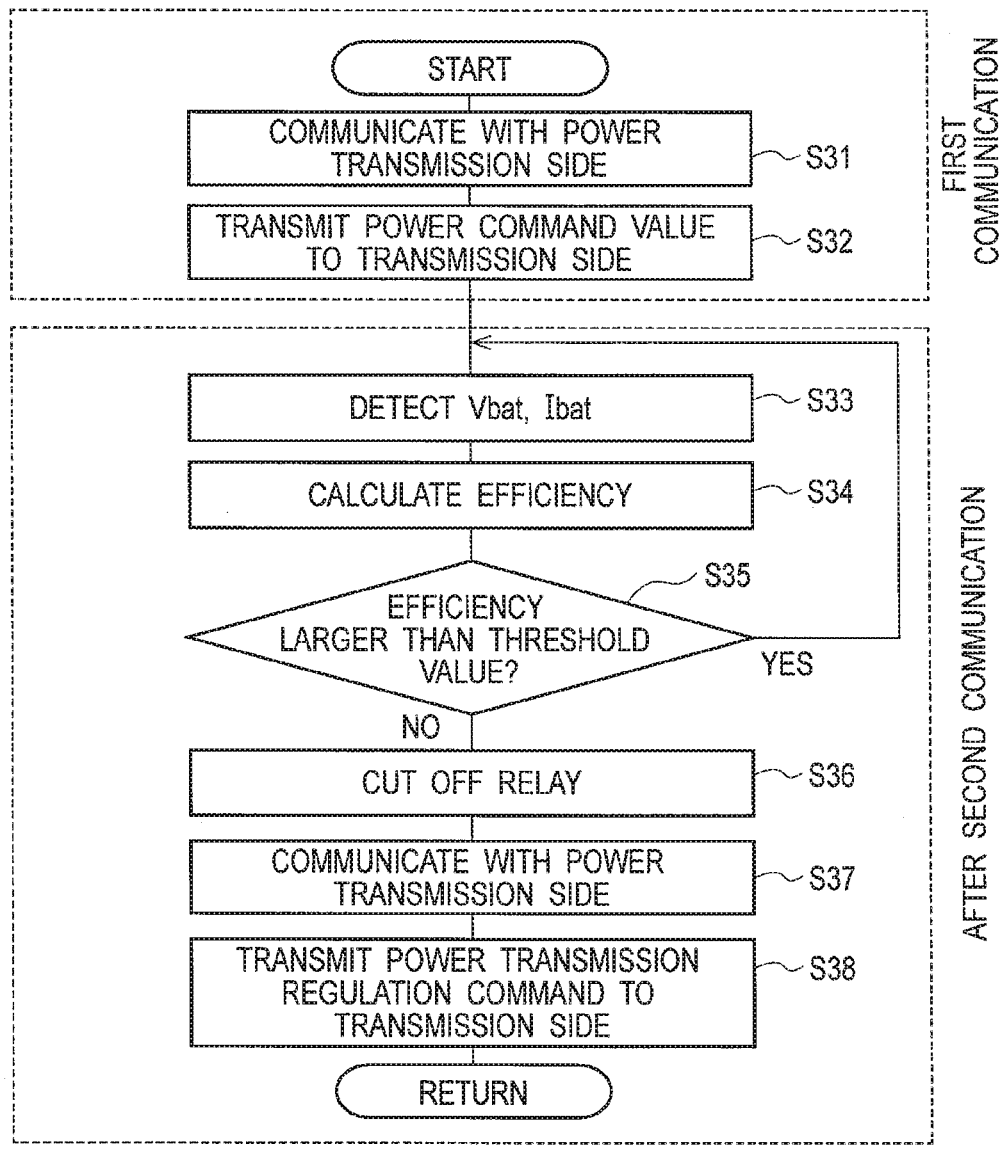
FIG. 4 is a flowchart showing a processing procedure of a power receiving controller in the wireless power supply system according to the first embodiment of the present invention.

Next, the operation of the wireless power supply system 100 according to the first embodiment is described below with reference to the flowcharts shown in FIG. 3 and FIG. 4. FIG. 3 is a flowchart showing a processing procedure implemented by the power transmission controller 30. In FIG. 3, the processing from step S11 to step S15 is executed in the calculation cycle in the first process after the calculation starts, and the following processing from step S16 is executed in the calculation cycle in the second process and repeated in the subsequent cycles.

First, in step S11, the wireless communication unit 34 communicates with the wireless communication unit 51 of the power receiving controller 50 in a wireless manner such as LAN communication. The wireless communication is carried out for the second cycle, as described above. In step S12, the wireless communication unit 34 receives the power command value Pbat* transmitted from the power receiving controller 50. In particular, the power command value Pbat* output from the battery controller 56 shown in FIG. 2 is transmitted from the wireless communication unit 51 and received by the wireless communication unit 34.

In step S13, the control amount calculator 29 implements an initial setting to set the output voltage command value Vdc* such that the output voltage Vdc output from the AC/DC converter 11 has the minimum value.

In step S14, the inverter controller 32 sets a drive frequency and a drive duty ratio of the inverter circuit 12 each to a predetermined constant value to drive the inverter circuit 12. In step S15, the power transmission coil 14 starts excitation. Namely, the AC current is applied to the power transmission coil 14 so as to generate magnetic flux.

In step S16, the voltmeter 22, the ammeter 21, the voltmeter 24, the ammeter 23, the voltmeter 26, and the ammeter 25 detect the voltage Vac, the current Iac, the voltage Vdc, the current Idc, the voltage V1, and the current I1, respectively. The voltage Vac and the current Iac are supplied to the control amount calculator 29, the voltage Vdc and the current Idc are supplied to the control amount calculator 29 and the power factor calculator 31, and the voltage V1 and the current I1 are supplied to the power factor calculator 31.

In step S17, the power factor calculator 31 calculates the power factor cos θ of the power output from the inverter circuit 12, according to the following formula (1).

$$\cos\theta = (Vdc \times Idc)/(V1 \times I1) \qquad (1)$$

In step S18, the control amount calculator 29 corrects the power command value Pbat*. The control amount calculator 29 obtains the corrected power command value Pbat*' according to the following formula (3).

$$Pbat^{*\prime} = Pbat^*/\cos\theta \qquad (3)$$

Figure 5:
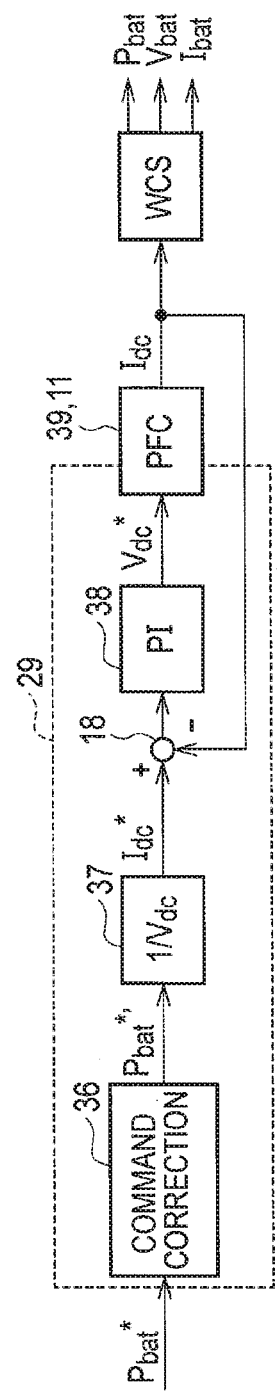
FIG. 5 is a block diagram showing a control amount calculator in the wireless power supply system according to the first embodiment of the present invention.

In step S19, the control amount calculator 29 calculates the voltage control amount Vdc* according to the block diagram shown in FIG. 5. As shown in FIG. 5, the charge power controller 36 corrects the power command value Pbat* based on the power factor cos θ to generate the corrected power command value Pbat*'. The primary-side current calculator 37 shown in FIG. 5 calculates the current command value Idc* by dividing the corrected power command value Pbat*' by the voltage Vdc detected in the previous calculation cycle.

A subtractor 18 subtracts the current Idc detected in the previous calculation cycle from the current command value Idc*. The primary-side current controller 38 then obtains the voltage command value Vdc* by PI control based on the subtraction result. The primary-side current controller 38 outputs the obtained voltage command value Vdc* to the PFC controller 39. The PFC controller 39 controls the duty ratio so that the output voltage of the AC/DC converter 11 corresponds to the voltage command value Vdc*. Accordingly, the power corresponding to the corrected power command value Pbat*' is transmitted from the power transmission coil 14 to the power receiving coil 41. In step S20 shown in FIG. 3, the voltage command value Vdc* is calculated, as described above. The power controlled according to the power factor cos θ is thus transmitted from the power transmission device 10 to the power receiving device 40.

In step S21, the control amount calculator 29 determines whether the power factor cos θ calculated by the power factor calculator 31 exceeds a threshold power factor. When the power factor cos θ exceeds the threshold power factor (YES in step S21), the process proceeds to step S22. When the power factor cos θ is less than or equal to the threshold power factor (NO in step S21), the process proceeds to step S23.

In step S22, the control amount calculator 29 determines whether the power transmission regulation command is transmitted from the power receiving controller 50. The process proceeds to step S23 when the power transmission regulation command is transmitted (YES in step S22), and the process returns to step S16 when the power transmission regulation command is not yet transmitted (NO in step S22).

In step S23, the control amount calculator 29 regulates the power supplied to the battery 44. In particular, the control amount calculator 29 regulates the voltage Vdc output from the AC/DC converter 11. When the power factor cos θ falls to the threshold power factor or less, or when the power transmission regulation command is received, the power transmitted from the power transmission coil 14 is regulated. The process in step S21 proceeds to step S23 when the power factor cos θ is the threshold power factor or less, as described above. However, the power transmission is occasionally not stabilized when the power factor cos θ is closer to the maximum value "1". The power factor cos θ may therefore be assigned an upper limit, so that the process in step S21 proceeds to step S23 also when the power factor cos θ exceeds the upper limit.

Next, a processing procedure implemented by the power receiving controller 50 is described below with reference to the flowchart shown in FIG. 4. The processing in step S31 and step S32 is executed in the calculation cycle in the first process after the calculation starts, and the following processing from step S33 is executed in the calculation cycle in the second process and repeated in the subsequent cycles.

First, in step S31, the wireless communication unit 51 communicates with the wireless communication unit 34 of the power transmission controller 30 in a wireless manner such as LAN communication. The wireless communication is carried out for the second cycle, as described above. In step S32, the wireless communication unit 51 transmits the power command value Pbat* output from the battery controller 56 to the power transmission controller 30 via wireless communication.

In step S33, the efficiency calculator 55 obtains the voltage Vbat detected by the voltmeter 46 and the current Ibat detected by the ammeter 45. In step S34, the efficiency calculator 55 calculates the power Pbat supplied to the battery 44 by multiplying the voltage Vbat and the current Ibat together. The efficiency calculator 55 further calculates the power transmission efficiency η of the power according to the following formula (2), based on the power Pbat and the power command value Pbat*.

$$\eta = P\text{bat}/P\text{bat}^* = (I\text{bat} \times V\text{bat})/P\text{bat}^* \quad (2)$$

In step S35, the efficiency calculator 55 determines whether the efficiency η calculated according to the formula (2) exceeds the predetermined threshold efficiency ηth. When the efficiency η exceeds the predetermined threshold efficiency ηth, that is, η>ηth (YES in step S35), the process returns to step S33. When the efficiency η is less than or equal to the predetermined threshold efficiency ηth, that is, η≤ηth (NO in step S35), the efficiency calculator 55 outputs the cut-off command signal to the relay controller 54 in step S36. The relay controller 54 then cuts off the relay 47. The transmitted power is thus regulated once the relay 47 is cut off, since the phase difference between the voltage V1 and the current I1 output from the inverter circuit 12 increases, and the power factor cos θ decreases.

The wireless communication unit 51 communicates with the wireless communication unit 34 of the power transmission controller 30 in step S37, and transmits the power transmission regulation command in step S38. The transmitted power transmission regulation command is detected in step S22 in FIG. 3, and the charge power is regulated in step S23. The power transmitted from the power transmission coil 14 can therefore be regulated when the power transmission efficiency η of the power transmitted from the power transmission coil 14 to the power receiving coil 41 is decreased.

In the wireless power supply system 100 according to the first embodiment, the power factor calculator 31 calculates the power factor cos θ of the power output from the inverter circuit 12, and the voltage Vdc output from the AC/DC converter 11 is regulated when the power factor cos θ falls to the predetermined threshold power factor or less. The transmitted power can therefore be regulated for the first cycle shorter than the second cycle which is the communication cycle of the wireless communication unit 34 when the power factor cos θ is decreased. Accordingly, unnecessary power transmission can immediately be suppressed, so that trouble with the system such as heat generation can be prevented, when the positions of the power transmission coil 14 and the power receiving coil 41 are shifted from each other for some reason, such as a collision of the vehicle with another, or contrived movement of the vehicle. Further, the power transmission can surely be regulated when the wireless communication between the wireless communication unit 34 and the wireless communication unit 51 is interrupted, since a reduction of the power factor cos θ is detected only through the calculation by the power transmission device 10 to regulate the transmitted power, without the need of data transmitted from the power receiving controller 50.

Further, a reduction of the power transmission efficiency η can be analyzed by use of the power factor cos θ with high accuracy, as compared with a case in which a level of the current I1 output from the inverter circuit 12 (current supplied to the power transmission coil 14) is detected for analyzing the power transmission efficiency. Since the current I1 includes both an active component and a reactive component, the level of the active component and the level of the reactive component cannot be analyzed independently. The power transmission efficiency by use of the power factor cos θ can be analyzed more accurately because a change of the active component is reflected.

Since the relay 47 is cut off when the power transmission efficiency η calculated by the efficiency calculator 55 falls to the threshold efficiency ηth or less, the circuit on the power receiving device 40 side including the power receiving coil 41 and the battery 44 is open as viewed from the power transmission coil 14 side. As a result, the impedance of the entire circuit, including the power transmission coil 14, the power receiving coil 41, and the battery 44 increases, and the phase difference between the current I1 and the voltage V1 output from the inverter circuit 12 increases. Accordingly, the transmitted power is regulated since the power factor cos θ decreases. Namely, the transmitted power can be regulated when the wireless communication between the wireless communication unit 34 and the wireless communication unit 51 is interrupted, and when a problem with the power transmission efficiency η is detected by the power receiving controller 50.

When a reduction of the efficiency η is detected by the power receiving device 40, the power transmission regulation command is transmitted to the power transmission controller 30 via wireless communication, so that the transmitted power is regulated. The power transmitted from the power transmission device 10 can therefore be regulated more accurately due to the power transmission regulation command even when the power factor cos θ is not reduced although a problem is caused.

Modified Example of First Embodiment

The first embodiment exemplified the case in which the power factor calculator 31 calculates the power factor cos θ to regulate the transmitted power when the power factor cos θ falls to the threshold power factor or less. In the modified example, a reduction of the power transmission efficiency is detected by use of the current I1 output from the inverter circuit 12 instead of the power factor cos θ. The current I1 increases as the transmission efficiency of the electric power transmitted from the power transmission coil 14 decreases. When a coupling coefficient between the power transmission coil 14 and the power receiving coil 41 is defined "α", the current I1 and the coupling coefficient α are correlated with each other. In particular, as the coupling coefficient α decreases, the current I1 increases.

In the modified example, a map indicating the correlation between the current I1 and the coupling coefficient α is preliminarily stored, and the coupling coefficient α is computed according to the map when the current I1 is detected, so that the transmitted power is regulated when the coupling coefficient α falls to a predetermined threshold level. Accordingly, unnecessary power transmission can immediately be suppressed, so that trouble with the system such as heat generation can be prevented when the positions of the power transmission coil 14 and the power receiving coil 41 are shifted from each other, as in the case of the first embodiment.

Second Embodiment

Figure 6:
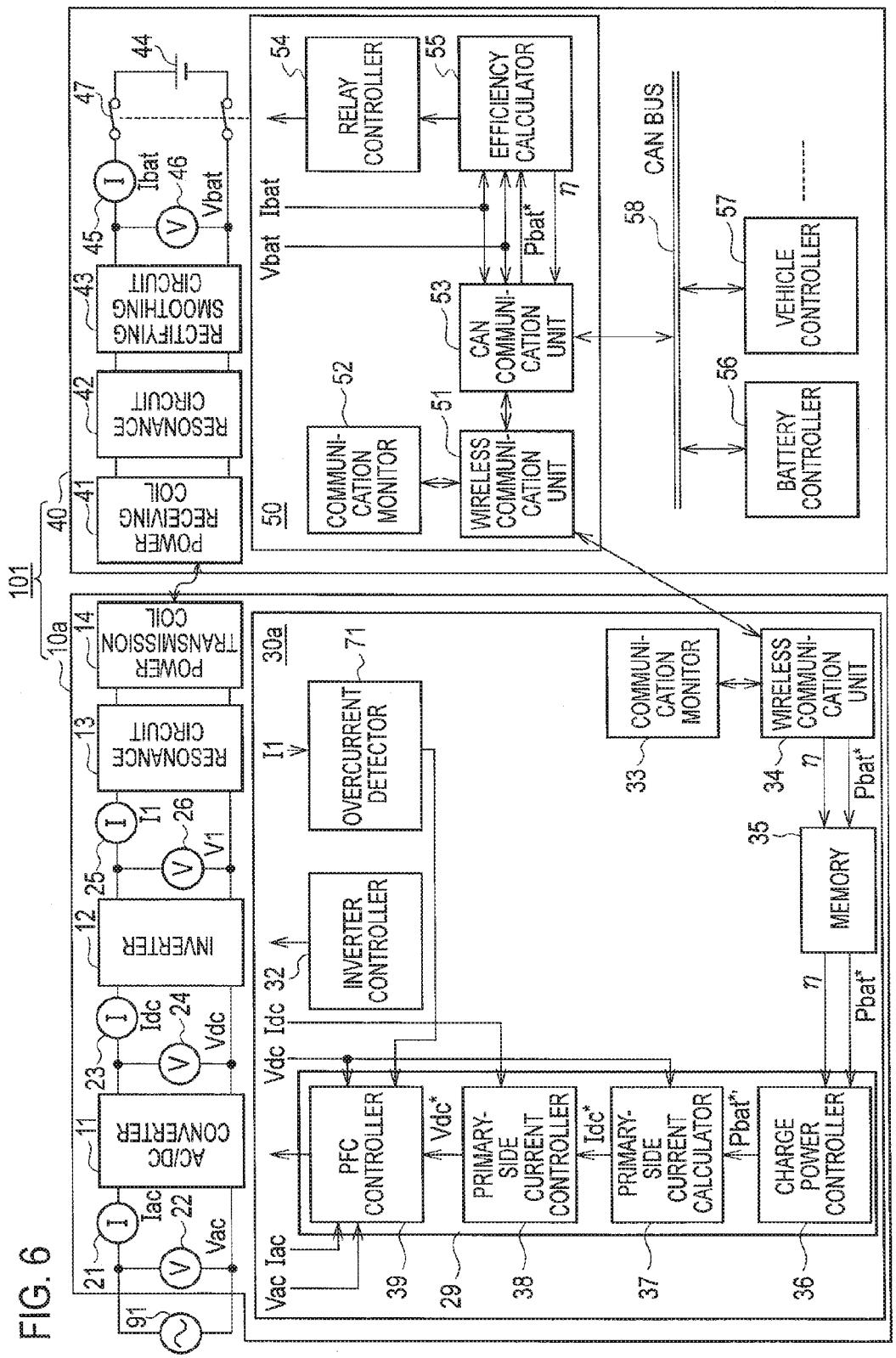
FIG. 6 is a block diagram showing a configuration of a wireless power supply system according to a second embodiment of the present invention.

A second embodiment of the present invention is described below. FIG. 6 is a block diagram showing a configuration of a wireless power supply system according to the second embodiment. As shown in FIG. 6, the wireless power supply system 101 according to the second embodiment differs from the wireless power supply system 100 shown in FIG. 2 in the configuration of a power transmission controller 30a provided in a power transmission device 10a. The other elements are the same as those shown in FIG. 2 and therefore denoted by the same reference numerals, and detail descriptions thereof are not repeated below.

The power transmission controller 30a includes the wireless communication unit 34, the communication monitor 33, the memory 35, the control amount calculator 29, and the inverter controller 32 for controlling the inverter circuit 12, as in the case shown in FIG. 2. The power transmission controller 30a further includes an overcurrent detector 71 that detects an overcurrent based on the current I1 detected by the ammeter 25. The power transmission controller 30a does not include the power factor calculator 31 shown in FIG. 2.

The wireless communication unit 34 communicates with the wireless communication unit 51, receives the power command value Pbat*, and receives the power transmission efficiency η transmitted from the wireless communication unit 51. The memory 35 stores the power command value Pbat* and the power transmission efficiency η received by the wireless communication unit 34.

The control amount calculator 29 includes the charge power controller 36, the primary-side current calculator 37, the primary-side current controller 38, and the PFC controller 39, as in the case shown in FIG. 2.

The charge power controller 36 obtains the power command value Pbat* and the power transmission efficiency η output from the memory 35, and corrects the power command value Pbat* according to the power transmission efficiency η. The charge power controller 36 outputs the corrected power command value Pbat*'. In particular, the charge power controller 36 outputs the corrected power command value Pbat*' calculated according to the following formula (4).

$$Pbat*' = Pbat*/\eta \tag{4}$$

The configurations of the primary-side current calculator 37, the primary-side current controller 38, and the PFC controller 39 are the same as those described in the first embodiment, and details descriptions thereof are not repeated below.

The overcurrent detector 71 obtains the current I1 output from the inverter 12 for the first cycle, and detects an overcurrent once the current I1 exceeds a predetermined threshold current. The overcurrent detector 71 outputs an overcurrent detection signal to the PFC controller 39. The PFC controller 39 regulates the output voltage of the AC/DC converter 11 when the overcurrent is detected by the overcurrent detector 71.

The power receiving controller 50 outputs the power transmission efficiency η calculated by the efficiency calculator 55 to the wireless communication unit 51 through the CAN communication unit 53. The wireless communication unit 51 transmits the power transmission efficiency η to the power transmission controller 30a. The power transmission efficiency η can be calculated according to the following formula (2), as described in the first embodiment.

$$\eta = Pbat/Pbat* = (Ibat \times Vbat)/Pbat* \tag{2}$$

Figure 7:
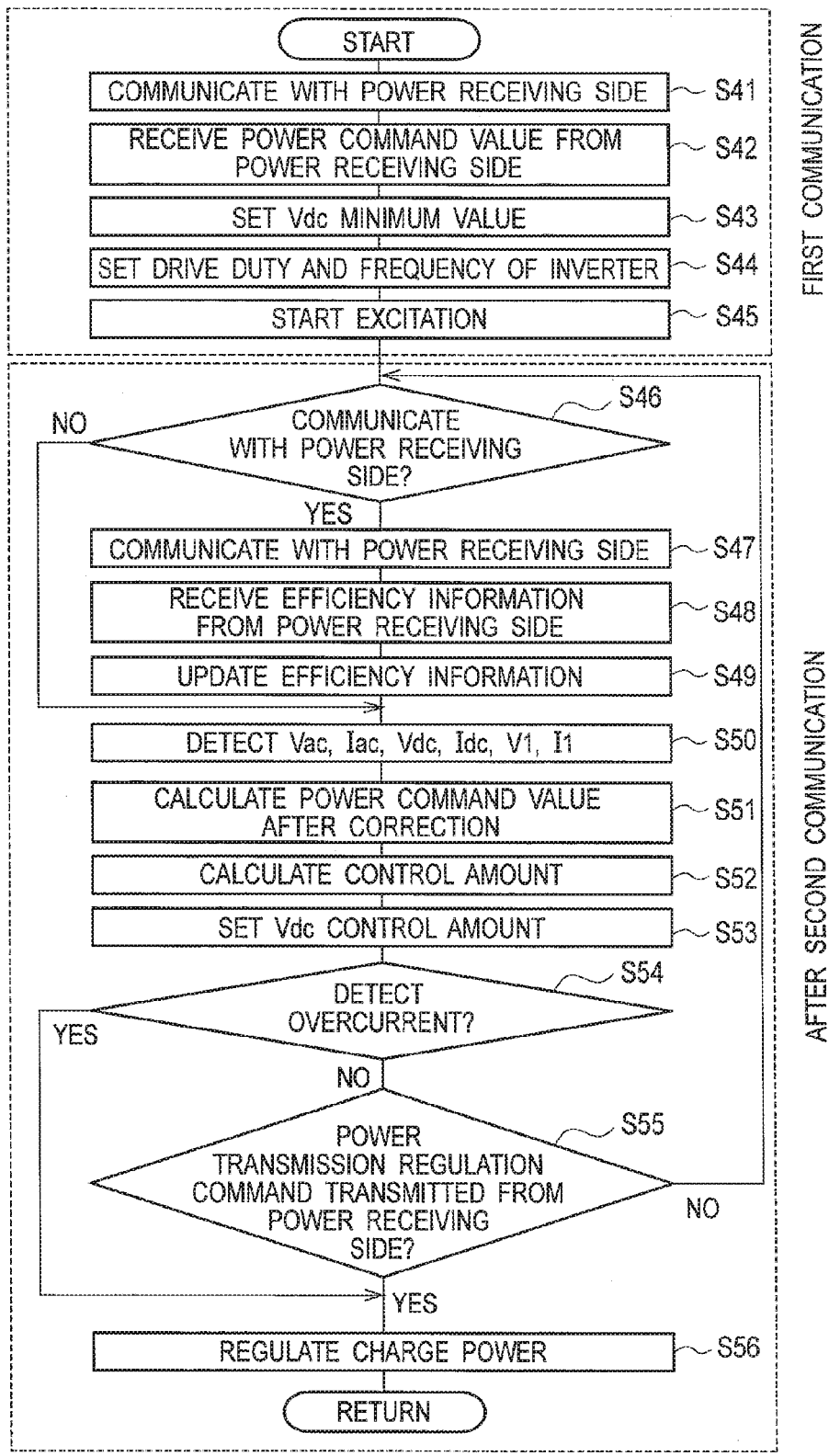
FIG. 7 is a flowchart showing a processing procedure of a power transmission controller in the wireless power supply system according to the second embodiment of the present invention.
Figure 8:
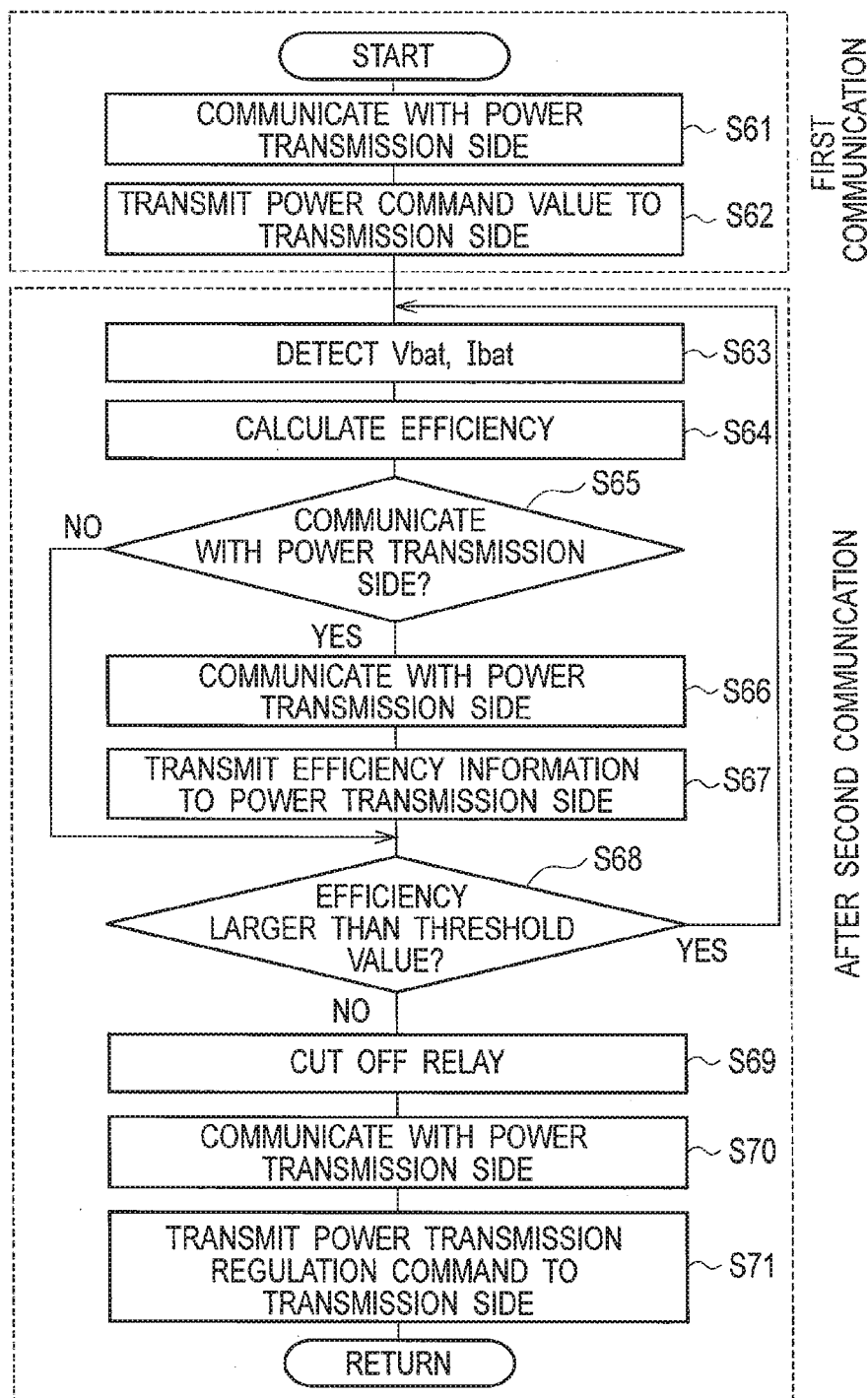
FIG. 8 is a flowchart showing a processing procedure of a power receiving controller in the wireless power supply system according to the second embodiment of the present invention.

Next, the operation of the wireless power supply system 101 according to the second embodiment configured as described above is described below with reference to the flowcharts shown in FIG. 7 and FIG. 8. FIG. 7 is a flowchart showing a processing procedure implemented by the power transmission controller 30a. In FIG. 7, the processing from step S41 to step S45 is executed in the calculation cycle in the first process after the calculation starts, and the following processing from step S46 is executed in the calculation cycle in the second process and repeated in the subsequent cycles. The processing from step S41 to step S45 is the same as that from step S11 to step S15 shown in FIG. 3, and detail descriptions thereof are not repeated below.

In step S46, the communication monitor 33 determines whether the communication cycle between the wireless communication unit 34 and the wireless communication unit 51 of the power receiving controller 50 is the second cycle. The process proceeds to step S47 when the communication cycle is the second cycle (YES in step S46), and the process proceeds to step S50 when the communication cycle is not the second cycle (NO in step S46).

In step S47, the wireless communication unit 34 communicates with the wireless communication unit 51 in a wireless manner. In step S48, the wireless communication unit 34 receives the power transmission efficiency η transmitted from the power receiving device 50. In step S49, the power transmission efficiency η stored in the memory 35 is updated.

In step S50, the voltmeter 22, the ammeter 21, the voltmeter 24, the ammeter 23, the voltmeter 26, and the ammeter 25 detect the voltage Vac, the current Iac, the voltage Vdc, the current Idc, the voltage V1, and the current I1, respectively. The voltage Vac, the current Iac, the voltage Vdc, and the current Idc are supplied to the control amount calculator 29, and the current I1 is supplied to the overcurrent detector 71.

In step S51, the control amount calculator 29 corrects the power command value Pbat* by use of the power transmission efficiency η. The control amount calculator 29 obtains the corrected power command value Pbat*' according to the following formula (4).

$$Pbat^{*'}=Pbat^*/\eta \qquad (4)$$

In step S52, the control amount calculator 29 calculates the voltage control amount Vdc* according to the block diagram shown in FIG. 5, as described above. In step S53, the control amount calculator 29 determines the control amount of the voltage Vdc. This calculation method is the same as that described in the first embodiment, and detail descriptions thereof are omitted here. According to this control, the electric power corresponding to the power transmission efficiency η is transmitted from the power transmission device 10a to the power receiving device 40.

In step S54, the control amount calculator 29 determines whether an overcurrent is detected by the overcurrent detector 71. As described below, the current I1 output from the inverter circuit 12 is recognized as an overcurrent when a reduction of the power transmission efficiency η is detected by the power receiving controller 50, and the relay 47 is thus cut off. In other words, the cut-off state of the relay 47 can be confirmed depending on whether the output current I1 is the overcurrent. The process proceeds to step S55 when the overcurrent is not detected (NO in step S54), and the process proceeds to step S56 when the overcurrent is detected (YES in step S54).

In step S55, the control amount calculator 29 determines whether the power transmission regulation command is transmitted from the power receiving controller 50. The process proceeds to step S56 when the power transmission regulation command is transmitted (YES in step S55), and the process returns to step S46 when the power transmission regulation command is not yet transmitted (NO in step S55).

In step S56, the control amount calculator 29 regulates the electric power supplied to the battery 44. In particular, the control amount calculator 29 regulates the output voltage of the AC/DC converter 11, so as to regulate the power transmitted from the power transmission coil 14 to the power receiving coil 41. Namely, the overcurrent is detected by the overcurrent detector 71 when the relay 47 is cut off, and the transmitted power is regulated accordingly.

Next, a processing procedure implemented by the power receiving controller 50 is described below with reference to the flowchart shown in FIG. 8. The processing in step S61 and step S62 is executed in the calculation cycle in the first process after the calculation starts, and the following processing from step S63 is executed in the calculation cycle in the second process and repeated in the subsequent cycles. The processing in step S61 and step S62 is the same as that in step S31 and step S32 shown in FIG. 4, and detail descriptions thereof are not repeated below.

In step S63, the efficiency calculator 55 obtains the voltage Vbat detected by the voltmeter 46 and the current Ibat detected by the ammeter 45. In step S64, the efficiency calculator 55 calculates the power Pbat supplied to the battery 44 by multiplying the voltage Vbat and the current Ibat together. The efficiency calculator 55 further calculates the power transmission efficiency η according to the following formula (2), based on the power Pbat and the power command value Pbat*.

$$\eta=Pbat/Pbat^*=(Ibat \times Vbat)/Pbat^* \qquad (2)$$

In step S65, the communication monitor 52 determines whether the communication cycle between the wireless communication unit 51 and the wireless communication unit 34 of the power transmission controller 30a is the second cycle. The process proceeds to step S66 when the communication cycle is the second cycle (YES in step S65), and the process proceeds to step S68 when the communication cycle is not the second cycle (NO in step S65).

In step S66, the wireless communication unit 51 communicates with the wireless communication unit 34 of the power transmission controller 30a in a wireless manner. In step S67, the wireless communication unit 51 transmits the power transmission efficiency η to the power transmission controller 30a. The power transmission efficiency η is received by the wireless communication unit 34 in step S48 in FIG. 7, and stored in the memory 35 in step S49. Accordingly, the power transmission efficiency η stored in the memory 35 is updated every time the second cycle has passed.

In step S68, the efficiency calculator 55 determines whether the power transmission efficiency η exceeds the predetermined threshold efficiency ηth. When the power transmission efficiency η exceeds the predetermined threshold efficiency ηth, that is, η>ηth (YES in step S68), the process returns to step S63. When the efficiency η is less than or equal to the predetermined threshold efficiency ηth, that is, η≤ηth (NO in step S68), the efficiency calculator 55 outputs the cut-off command signal to the relay controller 54 in step S69. The relay controller 54 then cuts off the relay 47. Accordingly, the transmitted power is regulated, since the current I1 output from the inverter circuit 12 results in the overcurrent when the relay 47 is cut off.

The wireless communication unit 51 further communicates with the wireless communication unit 34 of the power transmission controller 30a in step S70, and transmits the power transmission regulation command in step S71. The transmitted power transmission regulation command is detected in step S55 in FIG. 7, and the charge power is regulated in step S56. The power transmitted from the power transmission coil 14 can therefore be regulated when the power transmission efficiency η of the power from the power transmission coil 14 to the power receiving coil 41 is decreased.

In the wireless power supply system 101 according to the second embodiment, when the power transmission efficiency η calculated by the power factor calculator 55 falls to the predetermined threshold efficiency ηth or less, the relay 47 is cut off, so that the circuit on the power receiving device 40 side including the power receiving coil 41 and the battery 44 is open as viewed from the power transmission coil 14 side. As a result, the impedance of the entire circuit, including the power transmission coil 14, the power receiving coil 41, and the battery 44 increases, and the current I1 output from the inverter circuit 12 increases to result in the overcurrent. When the overcurrent detector 71 detects the overcurrent, the voltage Vdc output from the AC/DC converter 11 is regulated. Accordingly, the power transmitted from the power transmission coil 14 to the power receiving coil 41 is regulated. Since the detection of the overcurrent is carried out for the first cycle, the transmitted power can be regulated immediately.

Accordingly, unnecessary power transmission can immediately be suppressed, so that trouble with the system such as heat generation can be prevented, when the positions of the power transmission coil 14 and the power receiving coil 41 are shifted from each other for some reason, such as a collision of the vehicle with another, or contrived movement of the vehicle. Further, the transmitted power can be regulated also when the wireless communication between the wireless communication unit 51 and the wireless communication unit 34 is interrupted.

When a reduction of the power transmission efficiency η is detected by the power receiving controller 50, the power transmission regulation command is transmitted to the power transmission controller 30a via wireless communication for the second cycle, so that the transmitted power is regulated. Even when the relay 47 is not cut off in spite of the reduction of the power transmission efficiency η, the power transmitted from the power transmission coil 14 can be regulated due to the power transmission regulation command, so that unnecessary power transmission can more surely be suppressed.

The power transmission controller 30a corrects the power command value Pbat* to obtain the corrected power command value Pbat*' according to the power transmission efficiency η transmitted from the power receiving controller 50, and further calculates the voltage command value Vdc* by use of the corrected power command value Pbat*', so that the transmitted power can be controlled depending on the power transmission efficiency η. When the current I1 output from the inverter circuit 12 increases to result in the overcurrent and detected by the overcurrent detector 71, the overcurrent detection signal may be output to the inverter controller 32 instead of the PFC controller 39, so as to directly and forcibly stop the inverter circuit 12.

Modified Example of Second Embodiment

A modified example of the second embodiment is described below. The second embodiment exemplified the case in which the power receiving controller 50 calculates the power transmission efficiency η, and transmits the calculated power transmission efficiency η to the power transmission controller 30a. In the wireless power supply system according to the modified example, the power receiving controller 50 transmits data of the current that detected by the ammeter 45 and the voltage Vbat detected by the voltmeter 46 to the power transmission controller 30a, and the power transmission controller 30a then calculates the power transmission efficiency η. The calculation is thus executed according to the following formula (4), as used in step S51 shown in FIG. 7.

$$P\text{bat}*'=P\text{bat}*/\eta \quad (4)$$

The wireless power supply system according to the modified example can achieve the same effects as the wireless power supply system according to the second embodiment descried above.

Third Embodiment

Figure 9:
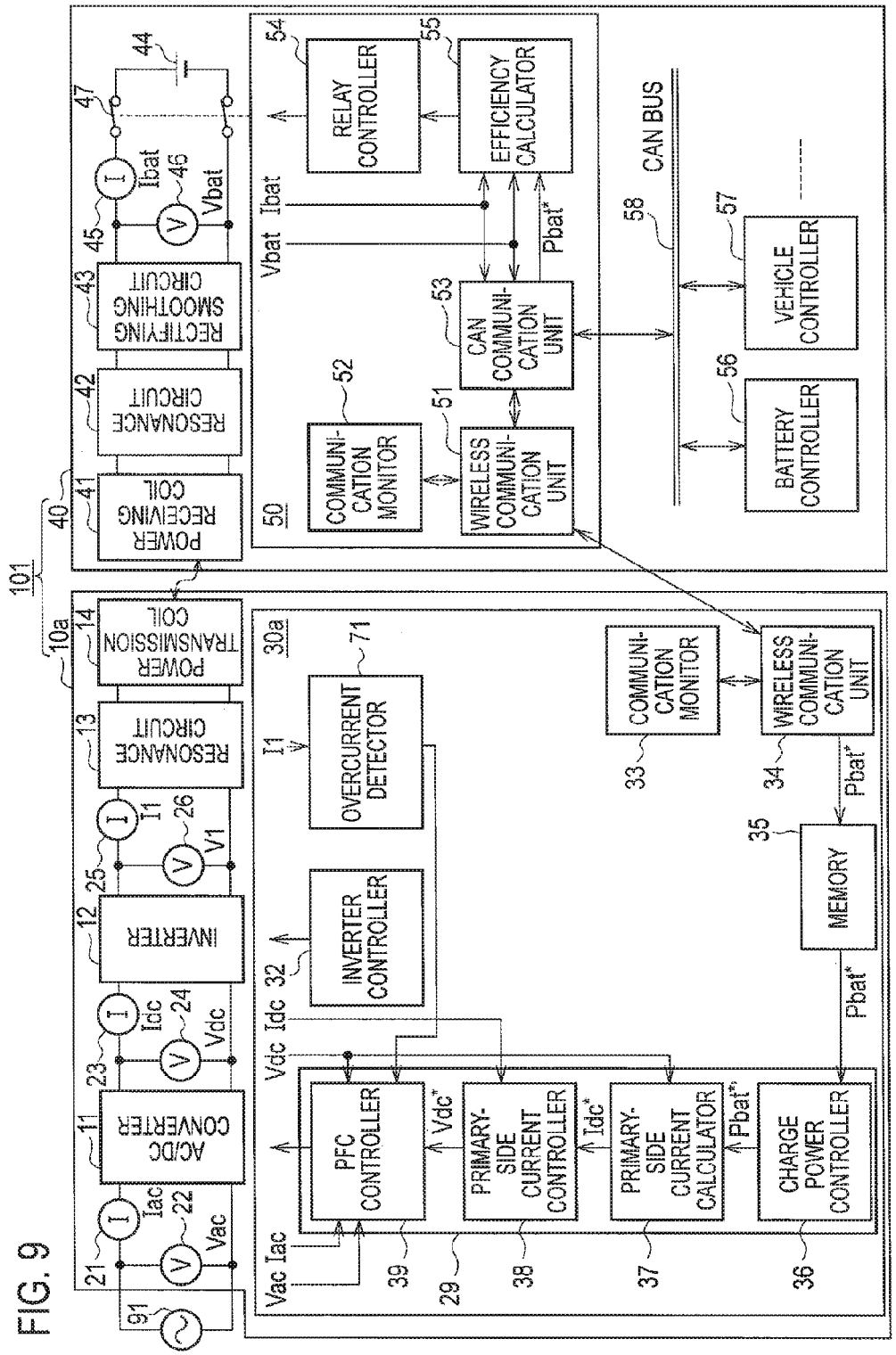
FIG. 9 is a block diagram showing a configuration of a wireless power supply system according to a third embodiment of the present invention.

A third embodiment of the present invention is described below. FIG. 9 is a block diagram showing a configuration of a wireless power supply system 101 according to the third embodiment. The wireless power supply system 101 shown in FIG. 9 has the same configuration as that shown in FIG. 6, but differs in that the power transmission efficiency η calculated by the efficiency calculator 55 is not transmitted to the power transmission controller 30a. The same elements are denoted by the same reference numerals, and detail descriptions thereof are not repeated below.

The operation of the wireless power supply system 101 according to the third embodiment is described below with reference to the flowcharts shown in FIG. 10 and FIG. 11.

Figure 10:
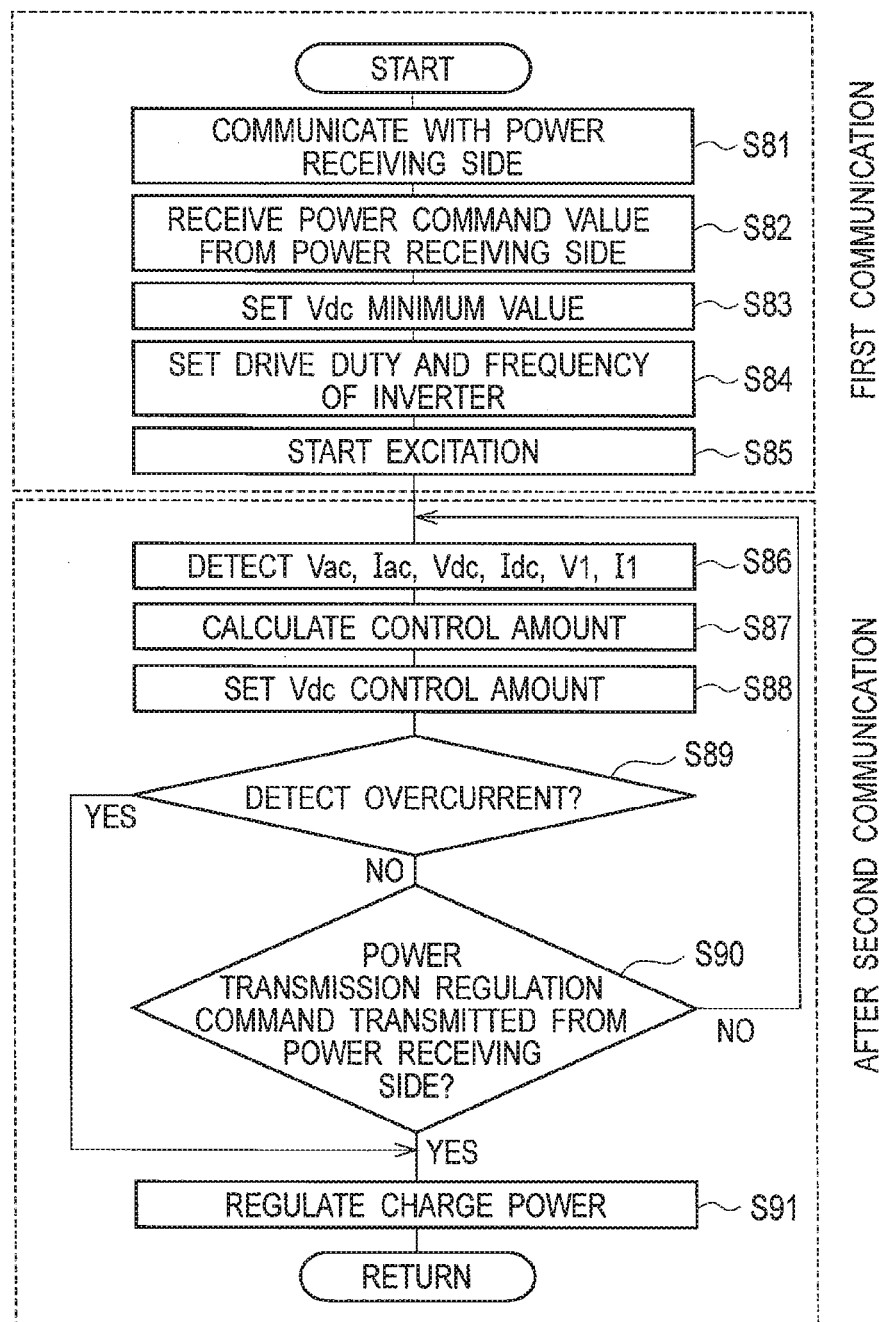
FIG. 10 is a flowchart showing a processing procedure of a power transmission controller in the wireless power supply system according to the third embodiment of the present invention.
Figure 11:
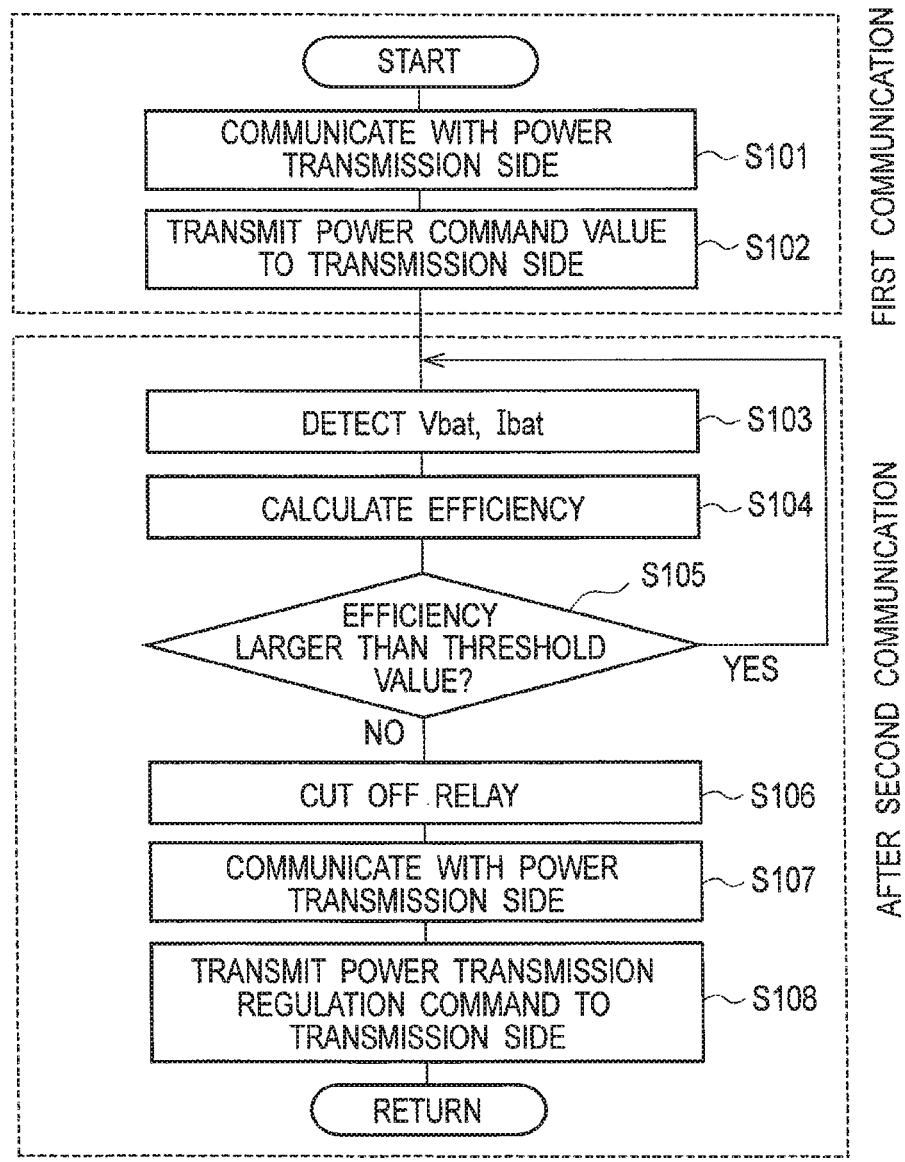
FIG. 11 is a flowchart showing a processing procedure of a power receiving controller in the wireless power supply system according to the third embodiment of the present invention.

FIG. 10 is a flowchart showing a processing procedure implemented by the power transmission controller 30a. In FIG. 10, the processing from step S81 to step S85 is executed in the calculation cycle in the first process after the calculation starts, and the following processing from step S86 is executed in the calculation cycle in the second process and repeated in the subsequent cycles. The processing from step S81 to step S85 is the same as that from step S41 to step S45 shown in FIG. 7, and detail descriptions thereof are not repeated below.

In step S86, the voltmeter 22, the ammeter 21, the voltmeter 24, the ammeter 23, the voltmeter 26, and the ammeter 25 detect the voltage Vac, the current Iac, the voltage Vdc, the current Idc, the voltage V1, and the current I1, respectively. The voltage Vac, the current Iac, the voltage Vdc, and the current Idc are supplied to the control amount calculator 29, and the current I1 is supplied to the overcurrent detector 71.

In step S87, the control amount calculator 29 calculates the voltage Vdc output from the AC/DC converter 11 based on the power command value Pbat*, so that the current Idc on the primary side of the inverter circuit 12 is constant. In step S88, the control amount calculator 29 determines the control amount of the voltage Vdc.

The processing from step S89 to step S91 is the same as that from step S54 to step S56 shown in FIG. 7, and detail descriptions thereof are not repeated below. Through the processing shown in FIG. 10, the overcurrent is detected by the overcurrent detector 71 when the relay 47 is cut off, and the transmitted power is regulated accordingly.

Next, a processing procedure implemented by the power receiving controller 50 is described below with reference to the flowchart shown in FIG. 11. The processing in step S101 and step S102 is executed in the calculation cycle in the first process after the calculation starts, and the following processing from step S103 is executed in the calculation cycle in the second process and repeated in the subsequent cycles. The processing from step S101 to step S104 is the same as that from step S61 to step S64 shown in FIG. 8, and detail descriptions thereof are not repeated below.

When the power transmission efficiency η is calculated in step S104, the efficiency calculator 55 determines in step S105 whether the power transmission efficiency η exceeds the predetermined threshold efficiency ηth. When the power transmission efficiency η exceeds the predetermined threshold efficiency ηth, that is, η>ηth (YES in step S105), the process returns to step S103. When the power transmission efficiency η is less than or equal to the predetermined threshold efficiency ηth, that is, η≤ηth (NO in step S105), the efficiency calculator 55 outputs the cut-off command signal to the relay controller 54 in step S106. The relay controller 54 then cuts off the relay 47. Accordingly, the transmitted power is regulated, since the current I1 output from the inverter circuit 12 results in the overcurrent when the relay 47 is cut off.

The wireless communication unit 51 communicates with the wireless communication unit 34 of the power transmission controller 30a in step S107, and transmits the power transmission regulation command in step S108. The transmitted power transmission regulation command is detected in step S90 in FIG. 10, and the charge power is regulated in step S91. More particularly, when the power transmission efficiency η of the power transmitted from the power transmission coil 14 to the power receiving coil 41 is decreased, the power transmission regulation command is transmitted for the second cycle, so that the power transmitted from the power transmission coil 14 is regulated.

In the wireless power supply system 101 according to the third embodiment, when the power transmission efficiency η calculated by the power factor calculator 55 falls to the predetermined threshold efficiency ηth or less, the relay 47 is cut off. The circuit on the power receiving device 40 side including the power receiving coil 41 and the battery 44 is thus open as viewed from the power transmission coil 14 side. As a result, the impedance of the entire circuit, including the power transmission coil 14, the power receiving coil 41, and the battery 44 increases, and the current I1 output from the inverter circuit 12 increases to result in the overcurrent. When the overcurrent detector 71 detects the overcurrent, the voltage Vdc output from the AC/DC converter 11 is regulated. Accordingly, the transmitted power from the power transmission coil 14 to the power receiving coil 41 is regulated. Since the detection of the overcurrent is carried out for the first cycle, the transmitted power can be regulated immediately.

Accordingly, unnecessary power transmission can immediately be suppressed, so that trouble with the system such as heat generation can be prevented, when the positions of the power transmission coil 14 and the power receiving coil 41 are shifted from each other for some reason, such as a collision of the vehicle with another, or contrived movement of the vehicle. Further, the transmitted power can be regulated also when the wireless communication between the wireless communication unit 51 and the wireless communication unit 34 is interrupted.

When a reduction of the power transmission efficiency η is detected by the power receiving controller 50, the power transmission regulation command is transmitted to the power transmission controller 30a via wireless communication for the second cycle, so that the transmitted power is regulated. Even when the relay 47 is not cut off in spite of the reduction of the power transmission efficiency η, the power transmitted from the power transmission coil 14 is regulated due to the power transmission regulation command, so that unnecessary power transmission can more surely be suppressed.

Since the power transmission controller 30a does not correct but keeps the command value Pbat* constant regardless of the change of the power transmission efficiency η, the calculation load can be reduced as compared with the case described in the second embodiment.

Fourth Embodiment

Figure 12:
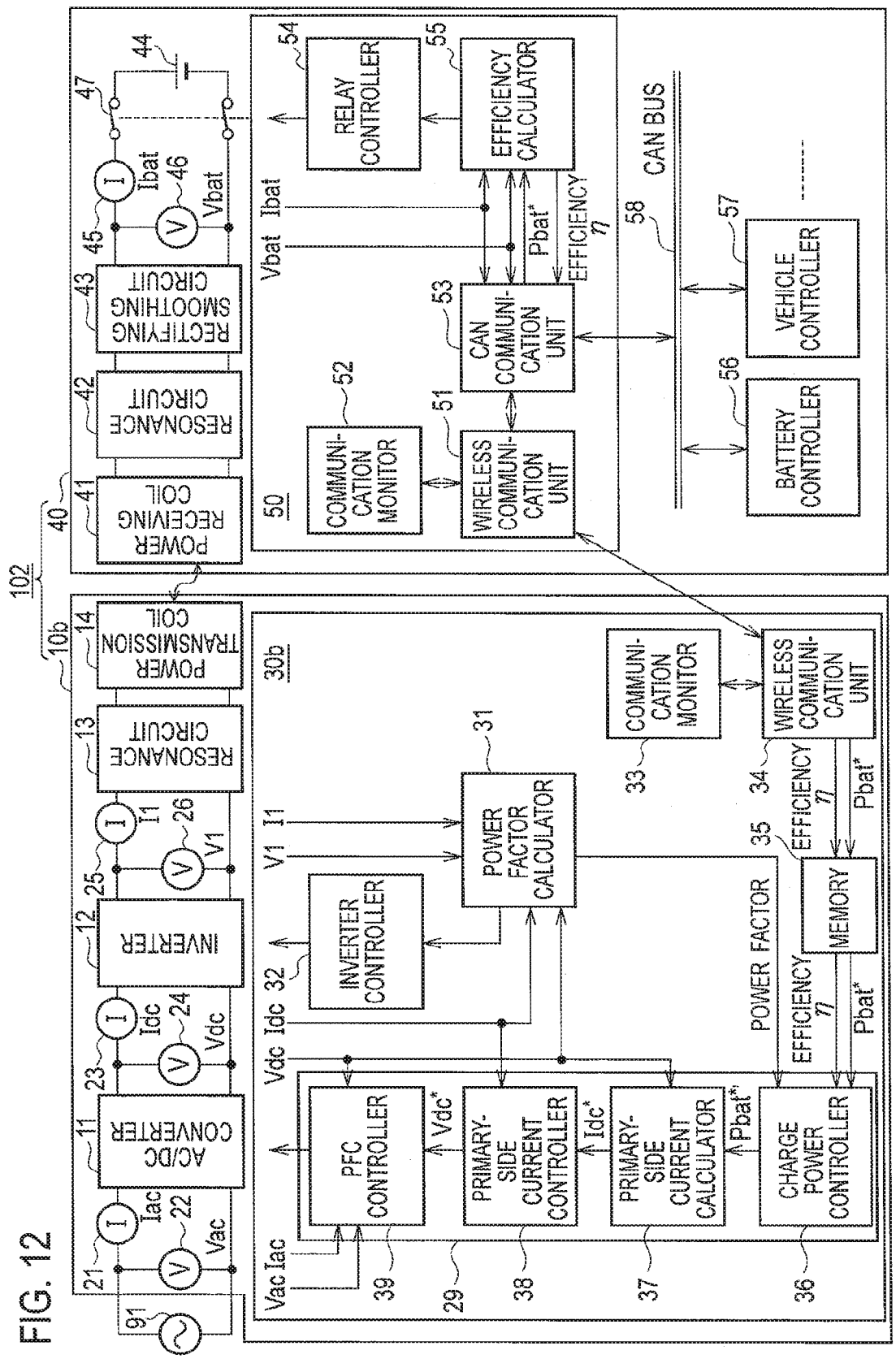
FIG. 12 is a block diagram showing a configuration of a wireless power supply system according to a fourth embodiment of the present invention.

A fourth embodiment of the present invention is described below. FIG. 12 is a block diagram showing a configuration of a wireless power supply system according to the fourth embodiment. The wireless power supply system 102 shown in FIG. 12 differs from the wireless power supply system 100 shown in FIG. 2 in that the efficiency calculator 55 of the power receiving controller 50 outputs the power transmission efficiency η to the CAN communication unit 53, and the power transmission efficiency η is then transmitted from the wireless communication unit 51, and further in that the power transmission efficiency η received by the wireless communication unit 34 is stored in the memory 35, and the control amount calculator 29 calculates the control amount of the voltage Vdc by use of the power transmission efficiency η. The other elements are the same as those shown in FIG. 2 and therefore denoted by the same reference numerals, and detail descriptions thereof are not repeated below. The communication between the respective wireless communication units 51 and 34 is carried out for the second cycle, as in the case of the first embodiment. The power factor cos θ is calculated by the power factor calculator 31 for the first cycle shorter than the second cycle.

Figure 13:
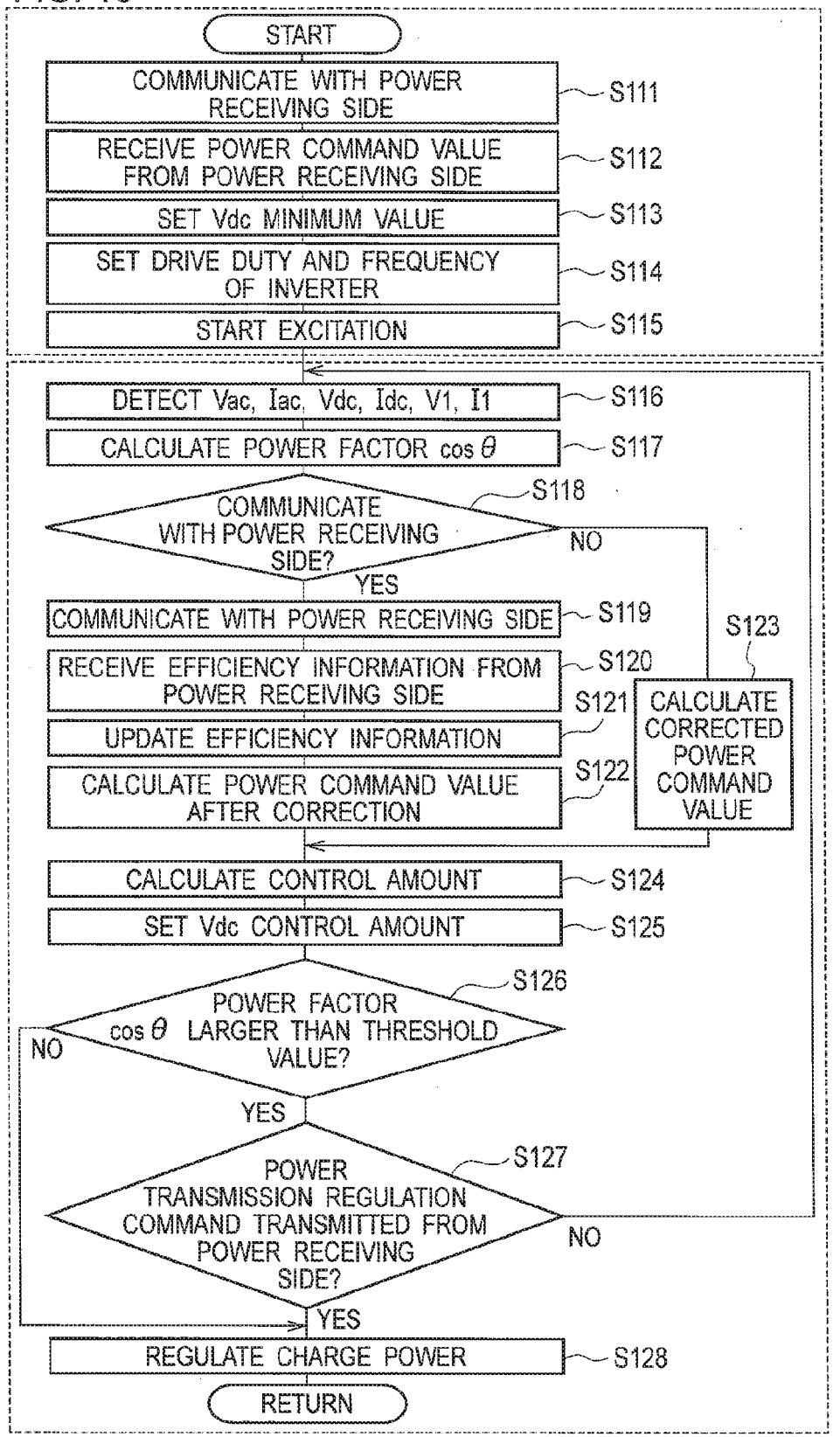
FIG. 13 is a flowchart showing a processing procedure of a power transmission controller in the wireless power supply system according to the fourth embodiment of the present invention.

The operation of the wireless power supply system 102 according to the fourth embodiment is described below with reference to the flowcharts shown in FIG. 13 and FIG. 14. In FIG. 13, the processing from step S111 to step S115 is executed in the calculation cycle in the first process after the calculation starts, and the following processing from step S116 is executed in the calculation cycle in the second process and repeated in the subsequent cycles. The processing from step S111 to step S117 is the same as that from step S11 to step S17 shown in FIG. 3, and detail descriptions thereof are not repeated below.

When the power factor cos θ is calculated in step S117, the communication monitor 33 determines in step S118 whether the communication cycle between the wireless communication unit 34 and the wireless communication unit 51 of the power receiving controller 50 is the second cycle. The process proceeds to step S119 when the communication cycle is the second cycle (YES in step S118), and the process proceeds to step S123 when the communication cycle is not the second cycle (NO in step S118).

In step S119, the wireless communication unit 34 communicates with the wireless communication unit 51. In step S120, the wireless communication unit 34 receives the power transmission efficiency η. In step S121, the memory 35 updates the power transmission efficiency η with newly received data. Since the communication by the wireless communication unit 34 is carried out in every second cycle, the power transmission efficiency η is updated by the memory 35 every time the second cycle has passed.

In step S122, the control amount calculator 29 corrects the power command value Pbat* by use of the power transmission efficiency η. The control amount calculator 29 obtains the corrected power command value Pbat*' according to the following formula (4).

$$Pbat^{*'} = Pbat^*/\eta \tag{4}$$

In step S123, the control amount calculator 29 corrects the power command value Pbat* by use of the power factor cos θ. The control amount calculator 29 obtains the corrected power command value Pbat*' according to the following formula (3).

$$Pbat^{*'} = Pbat^*/\cos\theta \tag{3}$$

When the communication cycle between the wireless communication unit 34 and the wireless communication unit 51 of the power receiving controller 50 is the second cycle, the control amount calculator 29 calculates the corrected power command value Pbat*' by use of the power transmission efficiency η (first efficiency) transmitted from the power receiving controller 50. When the communication cycle is not the second cycle, the control amount calculator 29 calculates the corrected power command value Pbat*' by use of the power factor cos θ (second efficiency) calculated by the power transmission controller 30b. The process then proceeds to step S124. The processing from step S124 to step S128 is the same as that from step S19 to step S23 shown in FIG. 3, and detail descriptions thereof are not repeated below.

Next, a processing procedure implemented by the power receiving controller 50 is described below with reference to the flowchart shown in FIG. 14. The processing in step S131 and step S132 is executed in the calculation cycle in the first process after the calculation starts, and the following processing from step S133 is executed in the calculation cycle in the second process and repeated in the subsequent cycles.

The processing from step S131 to step S134 is the same as that from step S31 to step S34 shown in FIG. 4, and detail descriptions thereof are not repeated below.

When the power transmission efficiency η is calculated by the efficiency calculator 55 in step S134, the communication monitor 52 determines in step S135 whether the communication cycle between the wireless communication unit 51 and the wireless communication unit 34 of the power transmission controller 30b is the second cycle. The process proceeds to step S136 when the communication cycle is the second cycle (YES in step S135), and the process proceeds to step S138 when the communication cycle is not the second cycle (NO in step S135).

In step S136, the wireless communication unit 51 communicates with the wireless communication unit 34 of the power transmission controller 30b. In step S137, the wireless communication unit 51 transmits the power transmission efficiency η. The process then proceeds to step S138. The processing from step S138 to step S141 is the same as that from step S35 to step S38 shown in FIG. 4, and detail descriptions thereof are not repeated below.

The processing is thus implemented such that the charge power Pbat of the battery 44 is calculated by use of the voltage Vbat and the current Ibat, and the power transmission efficiency η is obtained by the ratio of the charge power Pbat to the power command value Pbat*. The power transmission efficiency η thus obtained is transmitted to the power transmission controller 30b in every second cycle. When the power transmission efficiency η falls to the threshold power efficiency ηth or less, the relay 47 is cut off.

In the wireless power supply system 102 according to the fourth embodiment, the power factor cos θ of the power output from the inverter circuit 12 is calculated by the power factor calculator 31, and the voltage output from the AC/DC converter 11 is regulated when the power factor cos θ falls to the predetermined threshold power factor or less. The transmitted power can therefore be regulated for the first cycle shorter than the second cycle that is the communication cycle of the wireless communication unit 34, when the power factor cos θ is decreased.

The power transmission efficiency η calculated by the efficiency calculator 55 is transmitted to the power transmission controller 30b for the second cycle, and the power command value Pbat* is corrected based on the power transmission efficiency η. When the power transmission efficiency η falls to the threshold power efficiency ηth or less, the voltage Vdc output from the AC/DC converter 11 is regulated and therefore, the transmitted power is regulated.

Accordingly, unnecessary power transmission can immediately be suppressed, so that trouble with the system such as heat generation can be prevented, when the positions of the power transmission coil 14 and the power receiving coil 41 are shifted from each other for some reason, such as a collision of the vehicle with another, or contrived movement of the vehicle. Further, a reduction of the power transmission efficiency is detected by use of both the power factor cos θ (second efficiency) calculated for the first cycle and the power transmission efficiency η (first efficiency) obtained for the second cycle, and the transmitted power is regulated when one of the efficiencies is decreased. As a result, a margin for monitoring the transmitted power can be provided, so as to control the power transmission with higher accuracy.

When the power transmission efficiency η calculated by the power factor calculator 55 falls to the predetermined threshold efficiency ηth or less, the relay 47 is cut off, so that the circuit on the power receiving device 40 side including the power receiving coil 41 and the battery 44 is open as viewed from the power transmission coil 14 side. As a result, the impedance of the entire circuit, including the power transmission coil 14, the power receiving coil 41, and the battery 44 increases, and the phase difference between the current I1 and the voltage V1 output from the inverter circuit 12 increases. Accordingly, the transmitted power is regulated, since the power factor cos θ decreases. Namely, the transmitted power from the power transmission device 10b can be regulated when the wireless communication between the wireless communication unit 34 and the wireless communication unit 51 is interrupted, and when a problem with the power transmission efficiency η is detected by the power receiving device 40.

Modified Example of Fourth Embodiment

Figure 15:
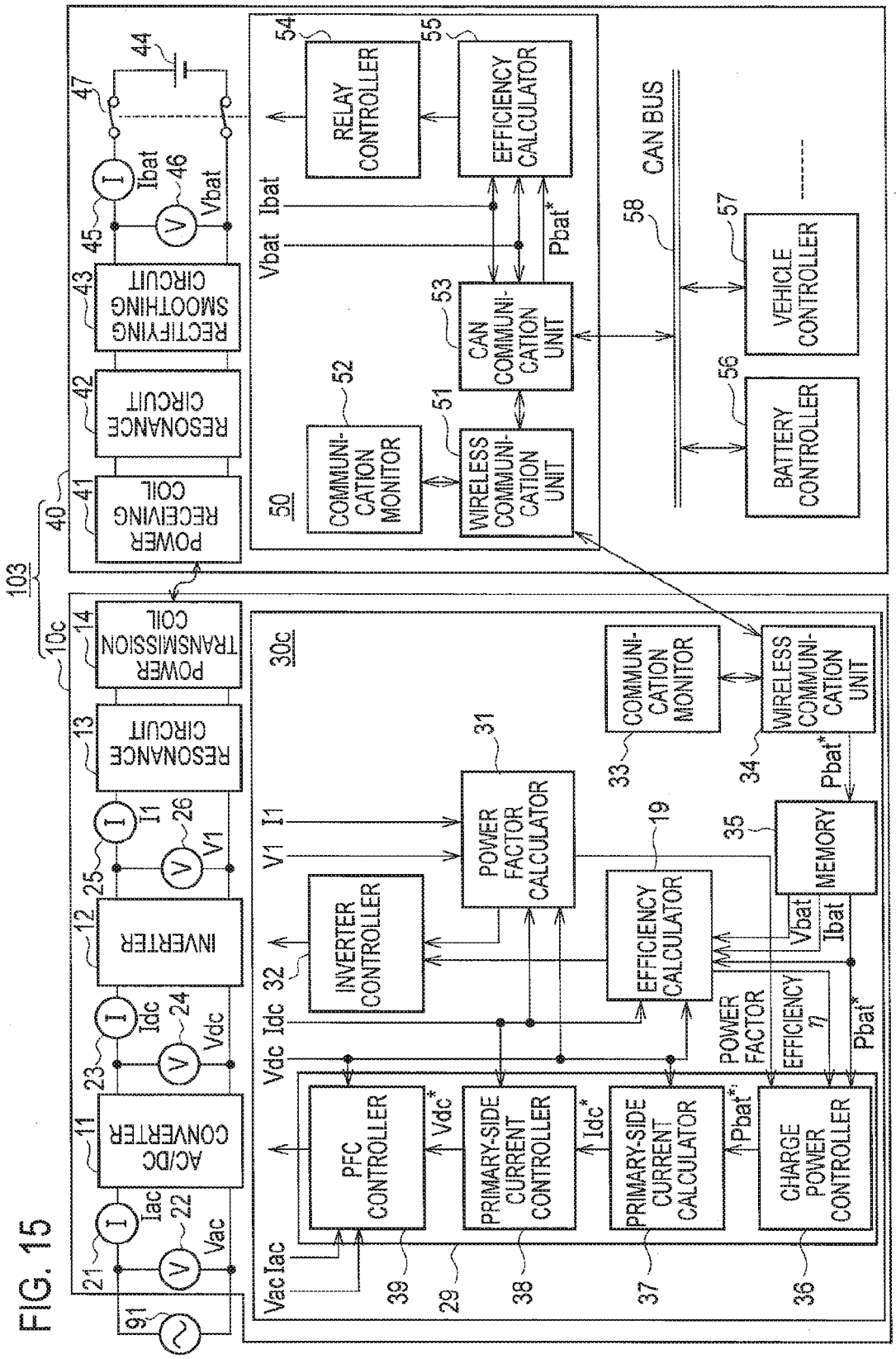
FIG. 15 is a block diagram showing a configuration of a wireless power supply system according to a modified example of the fourth embodiment of the present invention.

A modified example of the fourth embodiment is described below. FIG. 15 is a block diagram showing a configuration of a wireless power supply system according to the modified example of the fourth embodiment. The wireless power supply system 103 shown in FIG. 15 differs from the wireless power supply system shown in FIG. 12 in that the power transmission controller 30c of the power transmission device 10c includes an efficiency calculator 19.

The power receiving controller 50 transmits the voltage Vbat detected by the voltmeter 46 and the current Ibat detected by the ammeter 45 from the wireless communication unit 51. The wireless communication unit 34 of the power transmission controller 30c receives the voltage Vbat and the current Ibat, which are stored in the memory 35.

The efficiency calculator 19 calculates the power Pbat supplied to the battery 44 according to the voltage Vbat detected by the voltmeter 46 and stored in the memory 35 and the current Ibat detected by the ammeter 45 and stored in the memory 35. The efficiency calculator 19 further calculates the power transmission efficiency η by dividing the power Pbat by the power command value Pbat*. The efficiency calculator 19 transmits the calculated power transmission efficiency η to the charge power controller 36 and the inverter controller 32. The charge power controller 36 obtains the corrected power command value Pbat*' based on the power transmission efficiency η calculated by the efficiency calculator 19. The other elements are the same as those shown in FIG. 12 and therefore denoted by the same reference numerals, and detail descriptions thereof are not repeated below.

Figure 16:
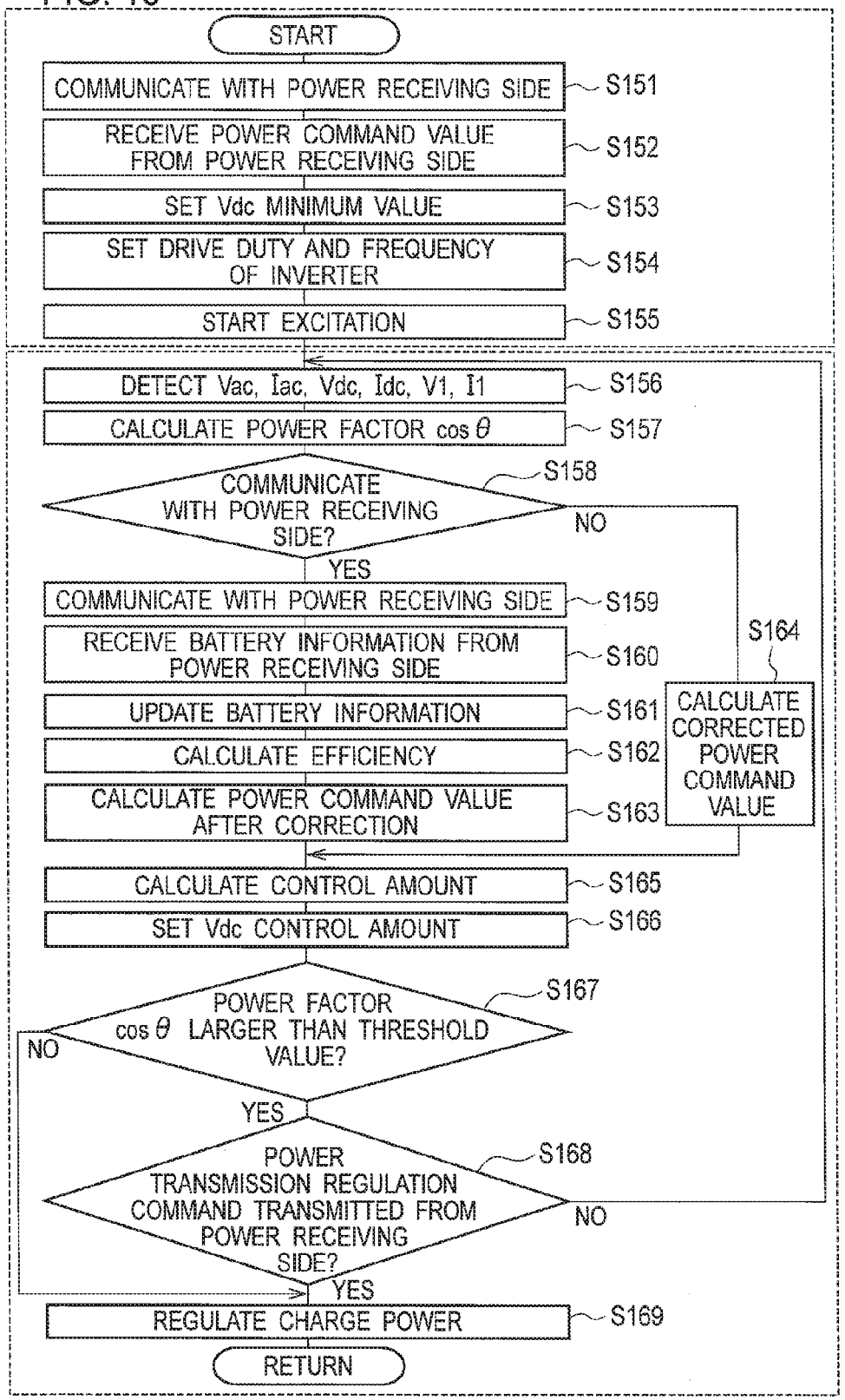

The operation of the modified example according to the fourth embodiment is described below with reference to the flowcharts shown in FIG. 16 and FIG. 17. In FIG. 16, the processing from step S151 to step S155 is executed in the calculation cycle in the first process after the calculation starts, and the following processing from step S156 is executed in the calculation cycle in the second process and repeated in the subsequent cycles. The processing from step S151 to step S157 is the same as that from step S111 to step S117 shown in FIG. 13 and therefore, the processing from step S158 is described below.

In step S158, the communication monitor 33 determines whether the communication cycle between the wireless communication unit 34 and the wireless communication unit 51 of the power receiving controller 50 is the second cycle. The process proceeds to step S159 when the communication cycle is the second cycle (YES in step S158), and the process proceeds to step S164 when the communication cycle is not the second cycle (NO in step S158).

In step S159, the wireless communication unit 34 communicates with the wireless communication unit 51 of the power receiving controller 50. In step S160, the wireless communication unit 34 receives the voltage Vbat and the current Ibat supplied to the battery 44. In step S161, the memory 35 updates the voltage Vbat and the current Ibat with newly received data. Since the communication by the wireless communication unit 34 is carried out in every second cycle, the voltage Vbat and the current Ibat are updated by the memory 35 every time the second cycle has passed.

In step S162, the efficiency calculator 19 calculates the power Pbat supplied to the battery 44 by multiplying the voltage Vbat and the current Ibat together, and further calculates the power transmission efficiency η by dividing the power Pbat by the power command value Pbat*.

In step S163, the control amount calculator 29 corrects the power command value Pbat* by use of the power transmission efficiency η. The control amount calculator 29 obtains the corrected power command value Pbat*' according to the following formula (4).

$$Pbat*' = Pbat*/\eta \quad (4)$$

In step S164, the control amount calculator 29 corrects the power command value Pbat* by use of the power factor cos θ. The control amount calculator 29 obtains the corrected power command value Pbat*' according to the following formula (3).

$$Pbat*' = Pbat*/\cos\theta \quad (3)$$

The process then proceeds to step S165. The processing from step S165 to step S169 is the same as that from step S19 to step S23 shown in FIG. 3, and detail descriptions thereof are not repeated below.

Next, a processing procedure implemented by the power receiving controller 50 is described below with reference to the flowchart shown in FIG. 17. The processing in step S171 and step S172 is executed in the calculation cycle in the second process after the calculation starts, and the following processing from step S173 is executed in the calculation cycle in the second process and repeated in the subsequent cycles.

Figure 14:
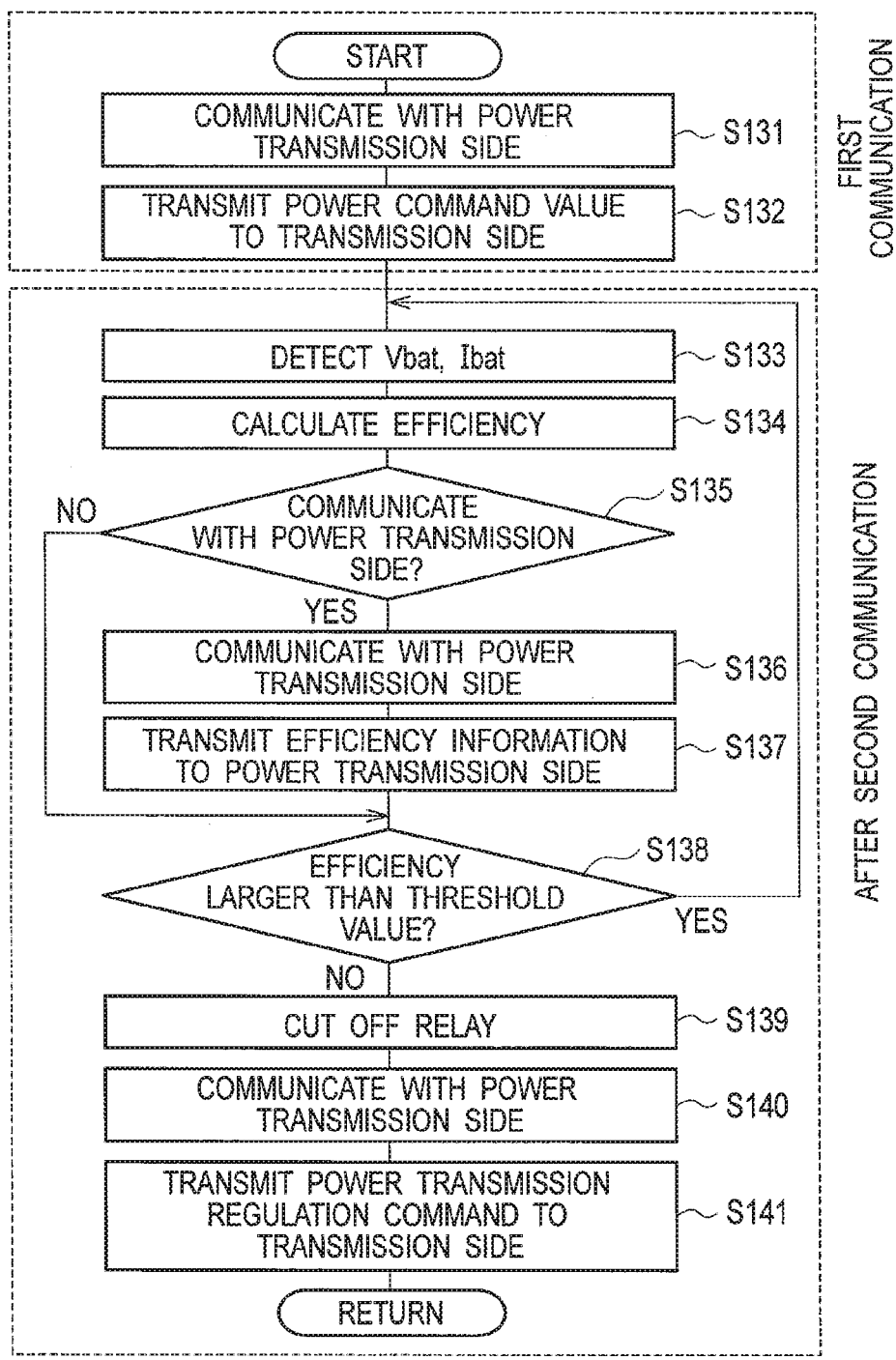
FIG. 14 is a flowchart showing a processing procedure of a power receiving controller in the wireless power supply system according to the fourth embodiment of the present invention.

The processing from step S171 to step S176 is the same as that from step S131 to step S136 shown in FIG. 14, and the processing from step S178 to step S181 is the same as that from step S138 to step S141 shown in FIG. 14. The procedure shown in FIG. 17 differs from that shown in FIG. 14 in the process in step S177.

In step S177, the wireless communication unit 51 transmits the voltage Vbat and the current Ibat which are the information of the battery 44. The process then proceeds to step S178. The voltage Vbat and the current Ibat transmitted from the wireless communication unit 51 is received by the wireless communication unit 34 in step S160 shown in FIG. 16, and then stored in the memory 35 in step S161.

In the fourth embodiment described above, the power receiving controller 50 calculates the power transmission efficiency η, and transmits the calculated power transmission efficiency η to the power transmission controller 30b. In the modified example of the fourth embodiment, the voltage Vbat and the current Ibat is transmitted to the power transmission controller 30c, and the power transmission controller 30c then calculates the power transmission efficiency η.

The wireless power supply system 103 according to the modified example can achieve the same effects as the wireless power supply system according to the fourth embodiment descried above. In the modified example, since the power transmission controller 30c calculates the power transmission efficiency η, the calculation load in the power receiving controller 50 can be reduced.

Although the wireless power supply system and the power transmission device according to the present invention have been described above by way of the embodiments shown in the drawings, the present invention is not limited to the descriptions thereof, and the respective configurations can be replaced with optional ones having similar functions.

REFERENCE SIGNS LIST 10, 10a, 10b, 10c POWER TRANSMISSION DEVICE
11 AC/DC CONVERTER
12 INVERTER CIRCUIT
13 RESONANCE CIRCUIT
14 POWER TRANSMISSION COIL
15 INVERTER
18 SUBTRACTOR
19 EFFICIENCY CALCULATOR
21 AMMETER
22 VOLTMETER
23 AMMETER
24 VOLTMETER
25 AMMETER
26 VOLTMETER
29 CONTROL AMOUNT CALCULATOR
30, 30a, 30b, 30c POWER TRANSMISSION CONTROLLER
31 POWER FACTOR CALCULATOR
32 INVERTER CONTROLLER
33 COMMUNICATION MONITOR
34 WIRELESS COMMUNICATION UNIT
35 MEMORY
36 CHARGE POWER CONTROLLER
37 PRIMARY-SIDE CURRENT CALCULATOR
38 PRIMARY-SIDE CURRENT CONTROLLER
39 PFC CONTROLLER
40 POWER RECEIVING DEVICE
41 POWER RECEIVING COIL
42 RESONANCE CIRCUIT
43 RECTIFYING SMOOTHING CIRCUIT
44 BATTERY
45 AMMETER
46 VOLTMETER
47 RELAY
50 POWER RECEIVING CONTROLLER
51 WIRELESS COMMUNICATION UNIT
52 COMMUNICATION MONITOR
53 CAN COMMUNICATION UNIT
54 RELAY CONTROLLER
55 EFFICIENCY CALCULATOR
56 BATTERY CONTROLLER
57 VEHICLE CONTROLLER
58 BUS LINE
71 OVERCURRENT DETECTOR
91 AC POWER SOURCE
100, 101, 102, 103 WIRELESS POWER SUPPLY SYSTEM
200 VEHICLE

The invention claimed is:

1. A wireless power supply system comprising a power transmission device provided on a ground side and having a power transmission coil, and a power receiving device provided in a vehicle and having a power receiving coil, the power transmission coil transmitting electric power to the power receiving coil via a wireless connection, so as to supply the electric power to an electrical load installed in the power receiving device, the power transmission device including:
an efficiency calculator configured to calculate a power transmission efficiency based on a transmission power command value and the electric power supplied to the electrical load; and
a switching controller configured to stop supplying the electric power received by the power receiving coil to the electrical load when the power transmission efficiency falls to a predetermined threshold efficiency or less, the power transmission device including:
a power factor calculator configured to calculate a power factor based on a phase difference between a voltage and a current supplied to the power transmission coil; and
a power controller configured to control electric power supplied to the power transmission coil according to a transmission power command value, and regulate the electric power supplied to the power transmission coil when the power factor falls to a predetermined threshold power factor or less since the electric power supplied to the electrical load is stopped.

2. The wireless power supply system according to claim 1, wherein:
the power transmission device includes a power transmission-side communication unit that communicates with the power receiving device, and the power receiving device includes a power receiving-side communication unit that communicates with the power transmission device; and
the power receiving device transmits the power transmission efficiency to the power transmission device, so as to regulate the electric power supplied to the power transmission coil when the power transmission efficiency falls to the threshold efficiency or less.

* * * * *